US012656961B2

(12) United States Patent
Lu et al.

(10) Patent No.: US 12,656,961 B2
(45) Date of Patent: Jun. 16, 2026

(54) REPORTING MULTIPLE EVENTS ASSOCIATED WITH MITIGATING USAGE-BASED DISTURBANCE

(71) Applicant: Micron Technology, Inc., Boise, ID (US)

(72) Inventors: Yang Lu, Boise, ID (US); Kang-Yong Kim, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/820,249

(22) Filed: Aug. 29, 2024

(65) Prior Publication Data

US 2026/0064290 A1 Mar. 5, 2026

(51) Int. Cl.
*G06F 3/06* (2006.01)

(52) U.S. Cl.
CPC .......... *G06F 3/0619* (2013.01); *G06F 3/0653* (2013.01); *G06F 3/0673* (2013.01)

(58) Field of Classification Search
None
See application file for complete search history.

(56) References Cited

U.S. PATENT DOCUMENTS

| | | |
|---|---|---|
| 2010/0122148 A1 | 5/2010 | Flynn et al. |
| 2012/0210109 A1 | 8/2012 | Lasch et al. |
| 2012/0284590 A1 | 11/2012 | Ku |

| | | | | |
|---|---|---|---|---|
| 2013/0290597 A1* | 10/2013 | Faber | .................. | G06F 13/1668 |
| | | | | 711/102 |
| 2015/0200002 A1* | 7/2015 | Lin | ................... | G11C 11/40618 |
| | | | | 711/106 |
| 2019/0228813 A1* | 7/2019 | Nale | ..................... | G06F 3/0619 |
| 2020/0111525 A1* | 4/2020 | Cowles | ................ | G11C 11/408 |
| 2021/0224155 A1 | 7/2021 | Bains et al. | | |
| 2022/0051716 A1 | 2/2022 | Ayyapureddi | | |
| 2022/0113868 A1* | 4/2022 | Cowles | ................ | G06F 3/0653 |

(Continued)

OTHER PUBLICATIONS

"Non-Final Office Action", U.S. Appl. No. 18/787,655, filed Sep. 5, 2025, 7 pages.

(Continued)

*Primary Examiner* — Jared I Rutz
*Assistant Examiner* — Alexander J Yoon
(74) *Attorney, Agent, or Firm* — Colby Nipper PLLC

(57) ABSTRACT

Apparatuses and techniques for reporting multiple events associated with mitigating usage-based disturbance are described. In an example aspect, a memory device can report to a memory controller various events associated with mitigating usage-based disturbance. This includes notifying the memory controller of events associated with a first event category and alerting the memory controller of events associated with a second event category. For events associated with the first event category, there can be a smaller risk of an alert condition occurring if the memory controller does not take action. For events associated with the second event category, there can be a larger risk of an alert condition occurring if the memory controller does not take action. By reporting these multiple events by category, the memory device empowers the memory controller to take appropriate action and efficiently manage available resources for mitigating usage-based-disturbance.

20 Claims, 16 Drawing Sheets

(56) References Cited

U.S. PATENT DOCUMENTS

| | | | |
|---|---|---|---|
| 2023/0176790 A1* | 6/2023 | Dhuse | G06F 11/1076 707/956 |
| 2024/0427497 A1 | 12/2024 | Lu | |
| 2024/0428842 A1 | 12/2024 | Lu et al. | |
| 2025/0094262 A1 | 3/2025 | Lu et al. | |

OTHER PUBLICATIONS

"Notice of Allowance", U.S. Appl. No. 18/787,655, Jan. 16, 2026, 8 pages.
"Non-Final Office Action", U.S. Appl. No. 18/743,309, Jan. 8, 2026, 14 pages.

\* cited by examiner

100

102-1

IoT 102-2

102-3

102-4

102-5

102-6

102-7

Apparatus
102

Host Device
104

Processor
110

Cache Memory
112

Memory Controller
114

116 — Interconnect
106

Memory Device
108

UBD Circuit
120

Local-
Bank Level
124

Event Reporting Circuit
122

Global-
Bank Level
126

Event Category
802-1

Action
804-1

Event Category
802-2

Action
804-2

Event Category
802-N

Action
804-N

Event Category
802

Risk Level
806

Priority Level
808

Time Interval
810

Notification 812
or Alert 814

Mask
816

Persistent
818

Action
804

Refresh Operation
820

Repair Operation
822

Optional
824

Required
826

Figure 12:
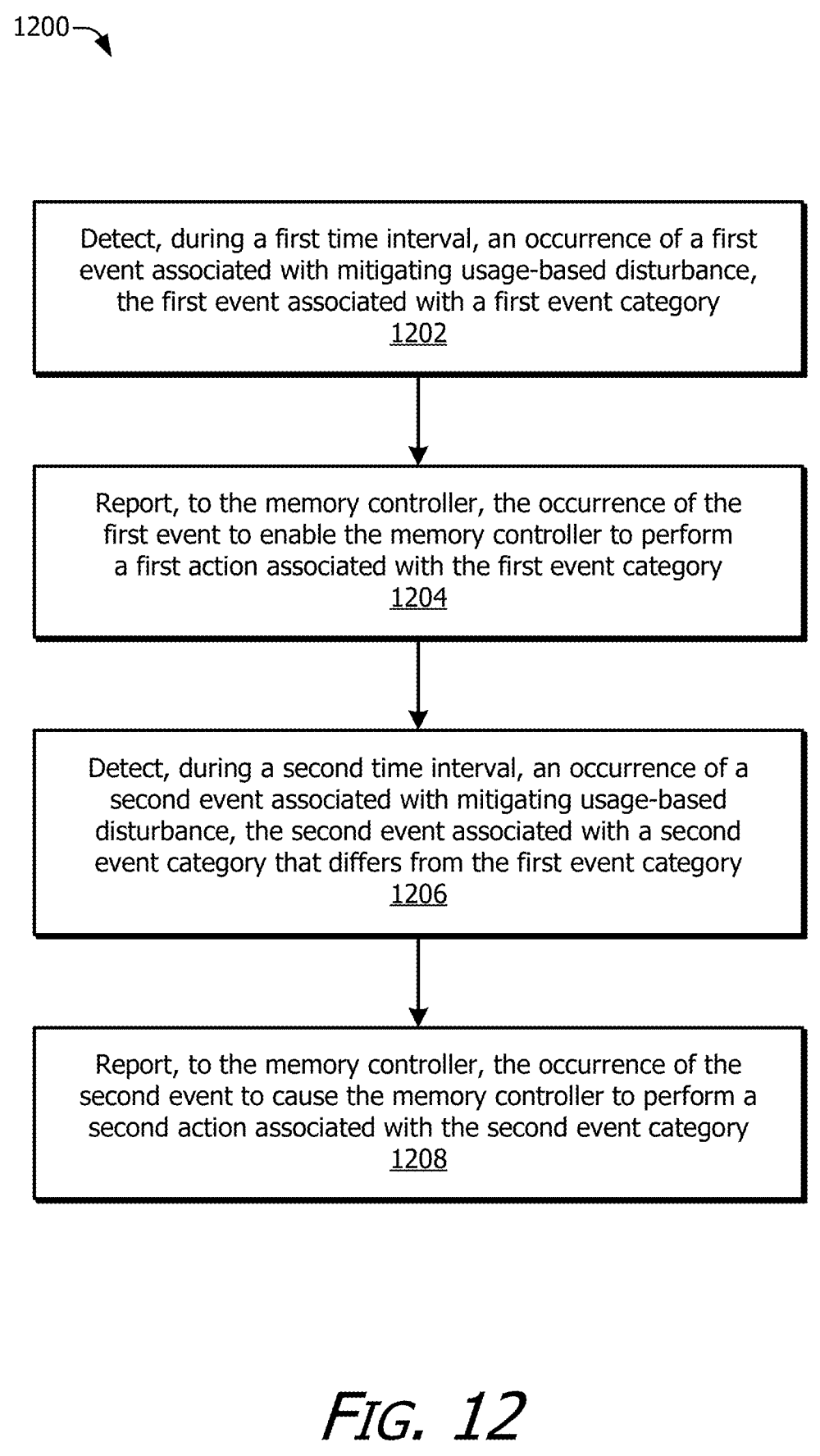

1200 —

Detect, during a first time interval, an occurrence of a first
event associated with mitigating usage-based disturbance,
the first event associated with a first event category
1202

↓

Report, to the memory controller, the occurrence of the
first event to enable the memory controller to perform
a first action associated with the first event category
1204

↓

Detect, during a second time interval, an occurrence of a
second event associated with mitigating usage-based
disturbance, the second event associated with a second
event category that differs from the first event category
1206

↓

Report, to the memory controller, the occurrence of the
second event to cause the memory controller to perform a
second action associated with the second event category
1208

Figure 13:
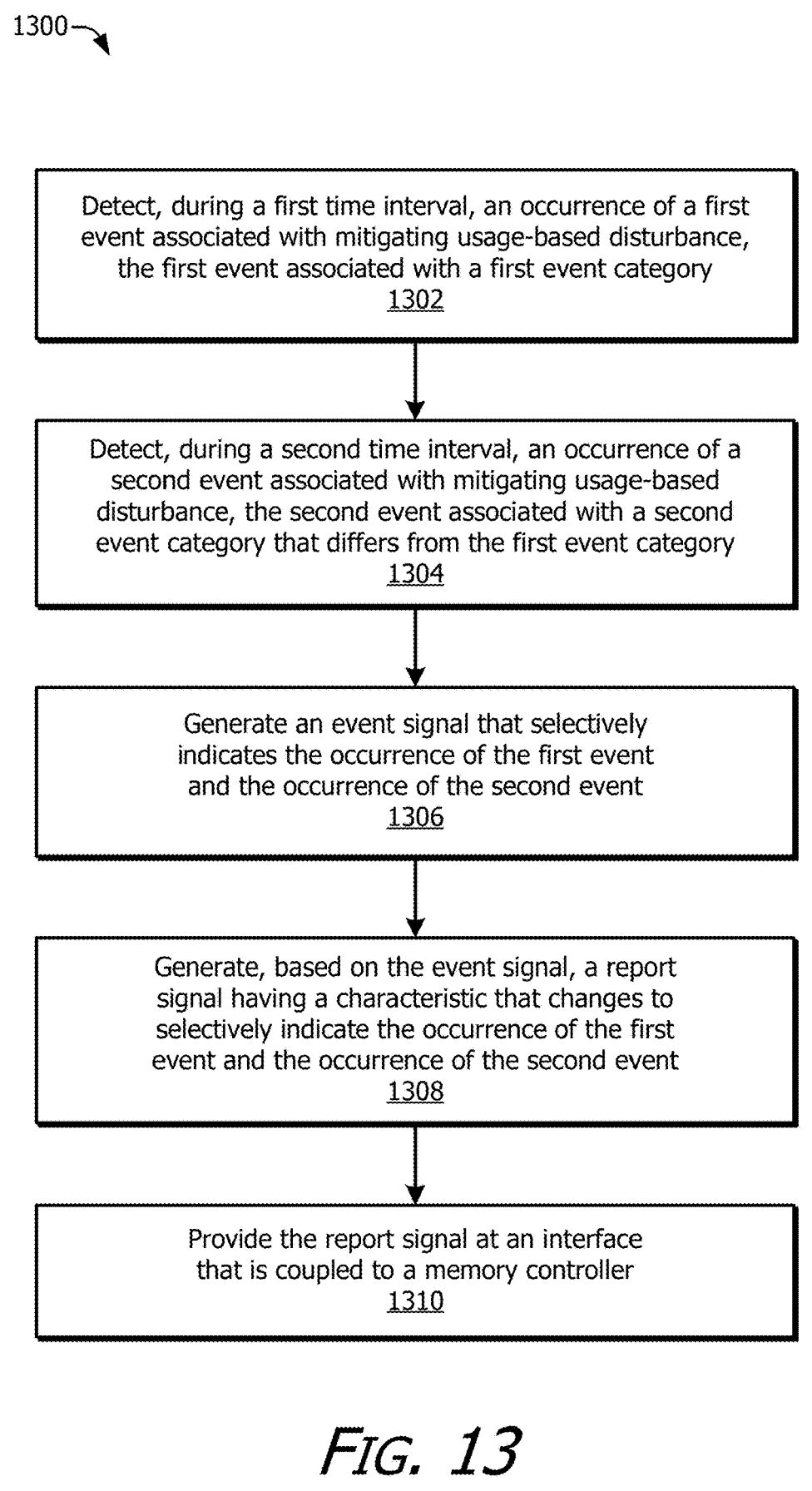

Detect, during a first time interval, an occurrence of a first event associated with mitigating usage-based disturbance, the first event associated with a first event category
1302

Detect, during a second time interval, an occurrence of a second event associated with mitigating usage-based disturbance, the second event associated with a second event category that differs from the first event category
1304

Generate an event signal that selectively indicates the occurrence of the first event and the occurrence of the second event
1306

Generate, based on the event signal, a report signal having a characteristic that changes to selectively indicate the occurrence of the first event and the occurrence of the second event
1308

Provide the report signal at an interface that is coupled to a memory controller
1310

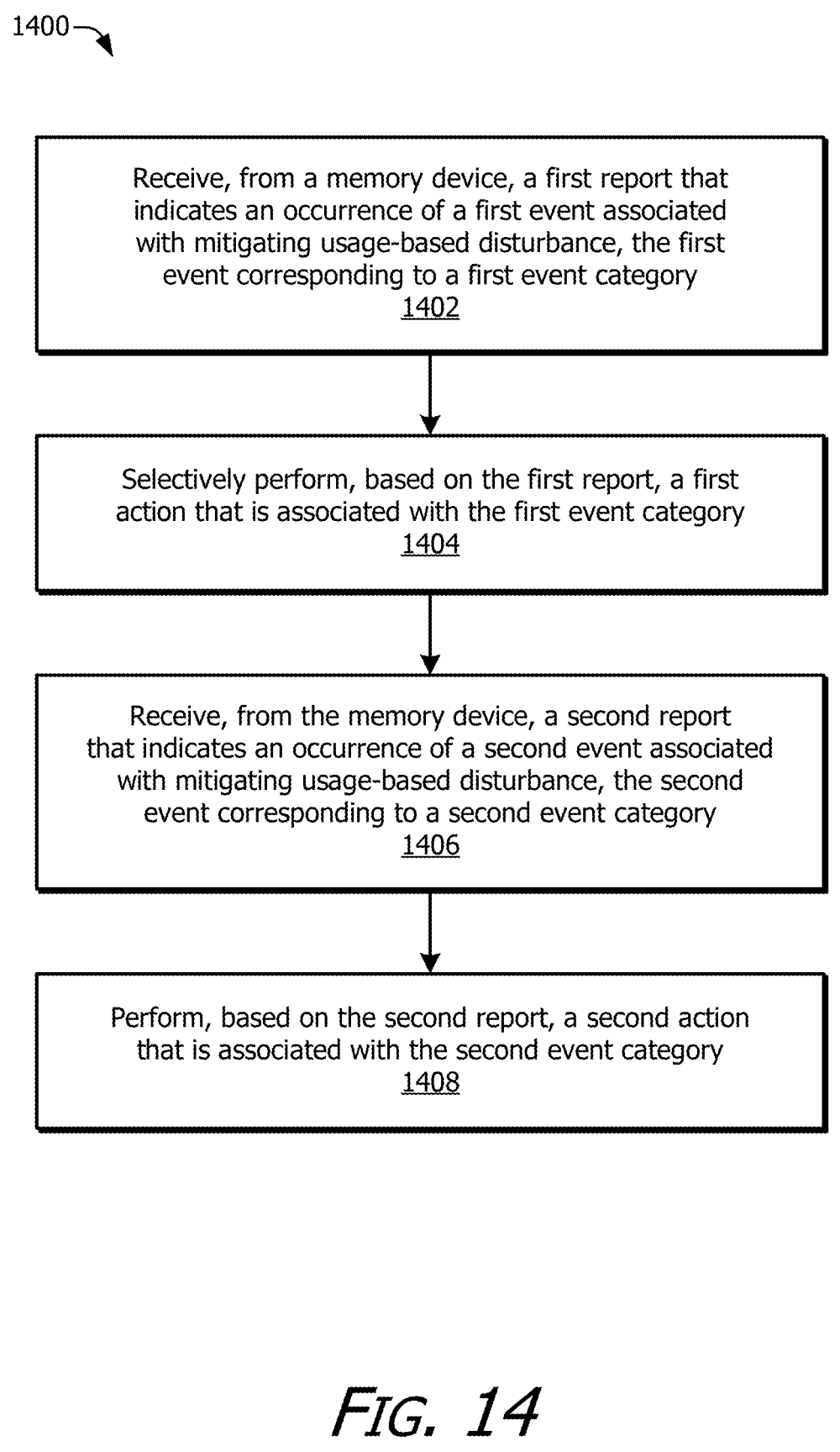

Receive, from a memory device, a first report that
indicates an occurrence of a first event associated
with mitigating usage-based disturbance, the first
event corresponding to a first event category
1402

↓

Selectively perform, based on the first report, a first
action that is associated with the first event category
1404

↓

Receive, from the memory device, a second report
that indicates an occurrence of a second event associated
with mitigating usage-based disturbance, the second
event corresponding to a second event category
1406

↓

Perform, based on the second report, a second action
that is associated with the second event category
1408

FIG. 14

REPORTING MULTIPLE EVENTS ASSOCIATED WITH MITIGATING USAGE-BASED DISTURBANCE

BACKGROUND

Computers, smartphones, and other electronic devices rely on processors and memories. A processor executes code based on data to run applications and provide features to a user. The processor obtains the code and the data from a memory. The memory in an electronic device can include volatile memory (e.g., random-access memory (RAM)) and non-volatile memory (e.g., flash memory). Like the capabilities of a processor, the capabilities of a memory can impact the performance of an electronic device. This performance impact can increase as processors are developed that execute code faster and as applications operate on increasingly larger data sets that require ever-larger memories.

BRIEF DESCRIPTION OF THE DRAWINGS

Apparatuses of and techniques for reporting multiple events associated with mitigating usage-based disturbance are described with reference to the following drawings. The same numbers are used throughout the drawings to reference like features and components:

FIG. 1 illustrates example apparatuses that can implement aspects of reporting multiple events associated with mitigating usage-based disturbance;

FIG. 3 illustrates example data stored within rows of a memory array;

FIG. 7-1 illustrates an example implementation of a usage-based-disturbance circuit;

FIG. 7-2 illustrates an example implementation of a detection circuit;

FIG. 9-1 illustrates example usage-based-disturbance-based events, event categories, and actions for reporting multiple events associated with mitigating usage-based disturbance;

FIG. 9-2 illustrates example events, an event category, and an action associated with a normal operation;

FIG. 12 illustrates a first example method for reporting multiple events associated with mitigating usage-based disturbance;

FIG. 13 illustrates a second example method for reporting multiple events associated with mitigating usage-based disturbance; and FIG. 14 illustrates an example method performed by a memory controller based on the reporting of multiple events associated with mitigating usage-based disturbance.

DETAILED DESCRIPTION

Overview

Figure 2:
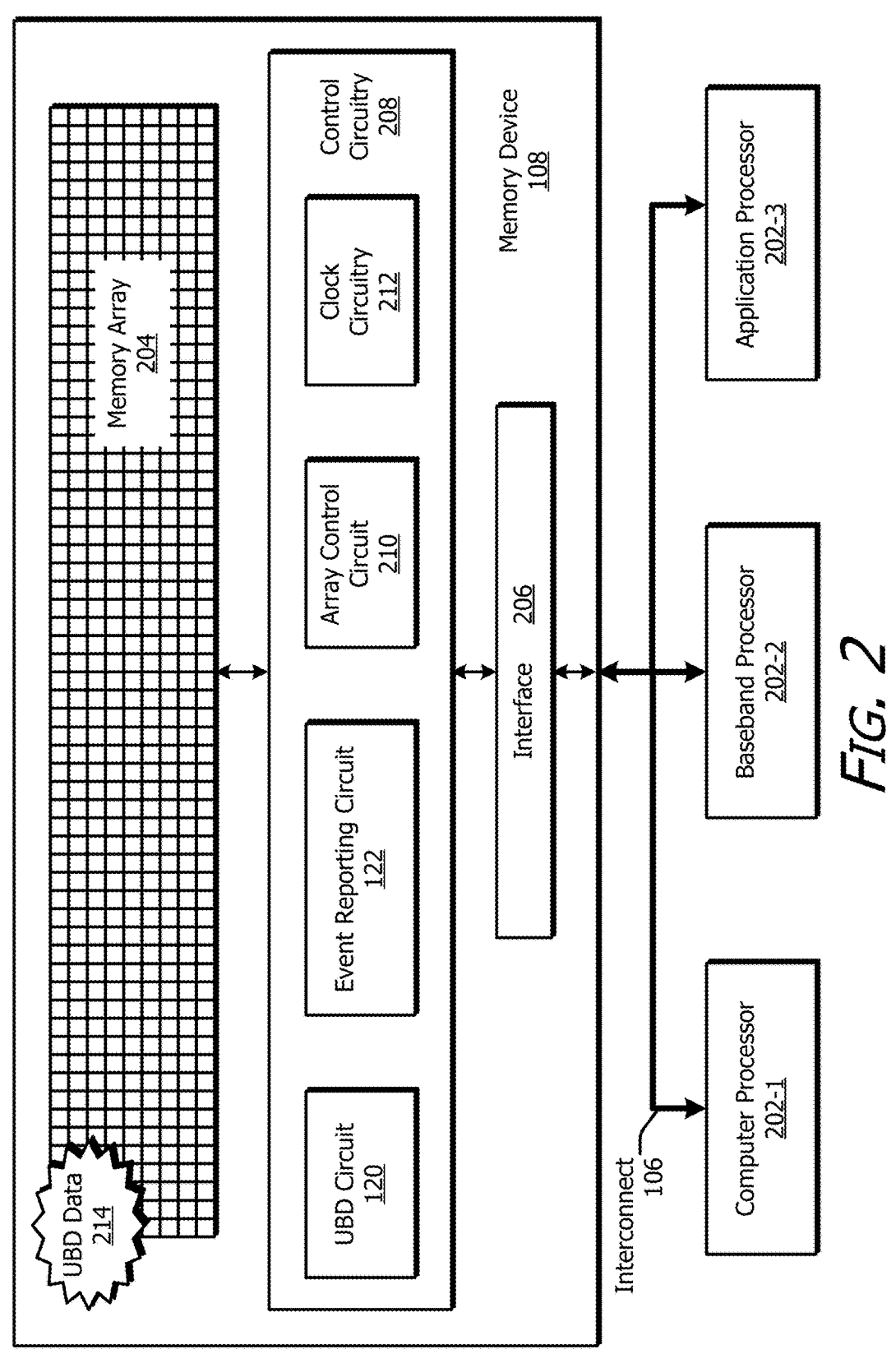
FIG. 2 illustrates an example computing system that can implement aspects of reporting multiple events associated with mitigating usage-based disturbance.

Processors and memory work in tandem to provide features to users of computers and other electronic devices. As processors and memory operate more quickly together in a complementary manner, an electronic device can provide enhanced features, such as high-resolution graphics and artificial intelligence (AI) analysis. Some applications, such as those for financial services, medical devices, and advanced driver assistance systems (ADAS), can also demand more-reliable memories. These applications use increasingly reliable memories to limit errors in financial transactions, medical decisions, and object identification, respectively. In some implementations, however, more-reliable memories can sacrifice bit density, power efficiency, and simplicity.

To meet the demands for physically smaller memories, memory devices can be designed with higher chip densities for the memory cells. Increasing chip density, however, can increase the electromagnetic coupling between proximate rows of memory cells due, at least in part, to a shrinking distance between these rows. With this undesired electromagnetic coupling (e.g., capacitive coupling), activation (or charging) of a first row of memory cells can sometimes negatively impact the integrity of the digital values stored in a second nearby row of memory cells. This phenomenon is referred to as usage-based disturbance herein. Activation of the first row can generate interference, or crosstalk, that causes the second row to experience a voltage fluctuation. In some instances, this voltage fluctuation can cause a state, or value, of a memory cell in the second row to be incorrectly determined by a sense amplifier. Consider an example in which a state of a memory cell in the second row is a logical "1" (e.g., a high voltage). In this example, the voltage fluctuation can cause a sense amplifier to incorrectly determine the state of the memory cell to be a logical "0" (e.g., a low voltage) instead of a logical "1." Left unchecked, this interference can lead to memory errors or data loss within the memory device.

In some circumstances, a particular row of memory cells is activated repeatedly in an unintentional or intentional manner, which can be part of a malicious act. Such a row that is repeatedly activated is referred to herein as an aggressor row. Consider, for instance, that memory cells in an $R^{th}$ row are subjected to repeated activation, which causes one or more memory cells in a proximate row (e.g., an adjacent row) to change states. Here, a proximate row can include another row within an R+1 row, which is an adjacent row; an R+2 row; an R−1 row, which is another adjacent row; and/or an R−2 row. These proximate rows are referred to herein as victim rows. The effect of changed memory states is referred to as a usage-based disturbance. The occurrence of usage-based disturbance can lead to the corruption or changing of contents within the affected row of memory. As described herein below, to combat the negative effects of usage-based disturbance, a memory device can perform usage-based-disturbance mitigation operations.

Some memory devices utilize circuits that can detect usage-based disturbance and mitigate its effects. To monitor for usage-based disturbance, a memory device can store an activation count for each row of a memory array. The activation count keeps track of a quantity of accesses or activations of the corresponding memory row. If the activation count meets (e.g., equals or exceeds) a threshold, nearby rows may be at increased risk for data corruption due to the repeated activations of the accessed row and the usage-based disturbance effect. To manage this risk to the affected rows, the memory device can refresh the proximate rows.

Mitigating usage-based disturbance can be a challenging balancing act in the presence of limited resources. It is generally desirable for the memory device to perform refresh operations to reduce a probability that the usage-based disturbance effect will manifest a data error. Refresh operations, however, consume power and limit an availability of the memory device to perform other operations, including normal read and write operations, thereby degrading an overall performance of the memory device as more refresh operations are performed.

Although limiting refresh operations for usage-based-disturbance mitigation can improve the overall performance and the power efficiency of the memory device, there is a greater risk of activation counts of one or more rows reaching an intrinsic specified limitation. To prevent this from happening, the memory device can become inaccessible to a memory controller and the user while it addresses an alert condition. As this denial-of-service (DOS) situation may be unsatisfactory for some host devices and/or users, memory controllers may be designed to overservice refresh operations for usage-based-disturbance mitigation at the cost of decreasing the overall performance and the power efficiency of the memory device.

Some memory devices do not communicate, to a memory controller, information regarding operations for mitigating usage-based disturbance until an alert condition causes a denial-of-service situation to occur. With limited visibility into the memory device's operations, it can be challenging for the memory controller to evaluate whether the current scheduling of refresh commands is appropriate. If the memory controller sends too many refresh commands, it is overservicing the usage-based-disturbance-mitigation operations and thereby wasting power and temporal resources. However, if the memory controller sends too few refresh commands, there is a higher risk of a denial-of-service situation occurring. In the case that the memory device does not provide an indication of its status regarding mitigating usage-based disturbance, the memory controller is unable to make changes in its scheduling of refresh commands to better balance overall performance and power efficiency with mitigating usage-based disturbance and preventing the denial-of-service situation.

To address this challenge and other issues regarding usage-based disturbance, this document describes techniques for reporting multiple events associated with mitigating usage-based disturbance. In an example aspect, a memory device can report to a memory controller various events associated with mitigating usage-based disturbance. The various events are grouped into different event categories. The memory device can report different events in different ways based on the event categories. This includes notifying the memory controller of events associated with a first event category and alerting the memory controller of events associated with a second event category. For events associated with the first event category, there can be a smaller risk of an alert condition occurring if the memory controller does not take action (e.g., does not send more refresh commands). For events associated with the second event category, there can be a larger risk of the alert condition occurring if the memory controller does not take action (e.g., does not send more refresh commands). By reporting these multiple events by category, the memory device empowers the memory controller to take appropriate action and efficiently manage available resources for mitigating usage-based-disturbance.

Example Operating Environments

Figures 1, 7:
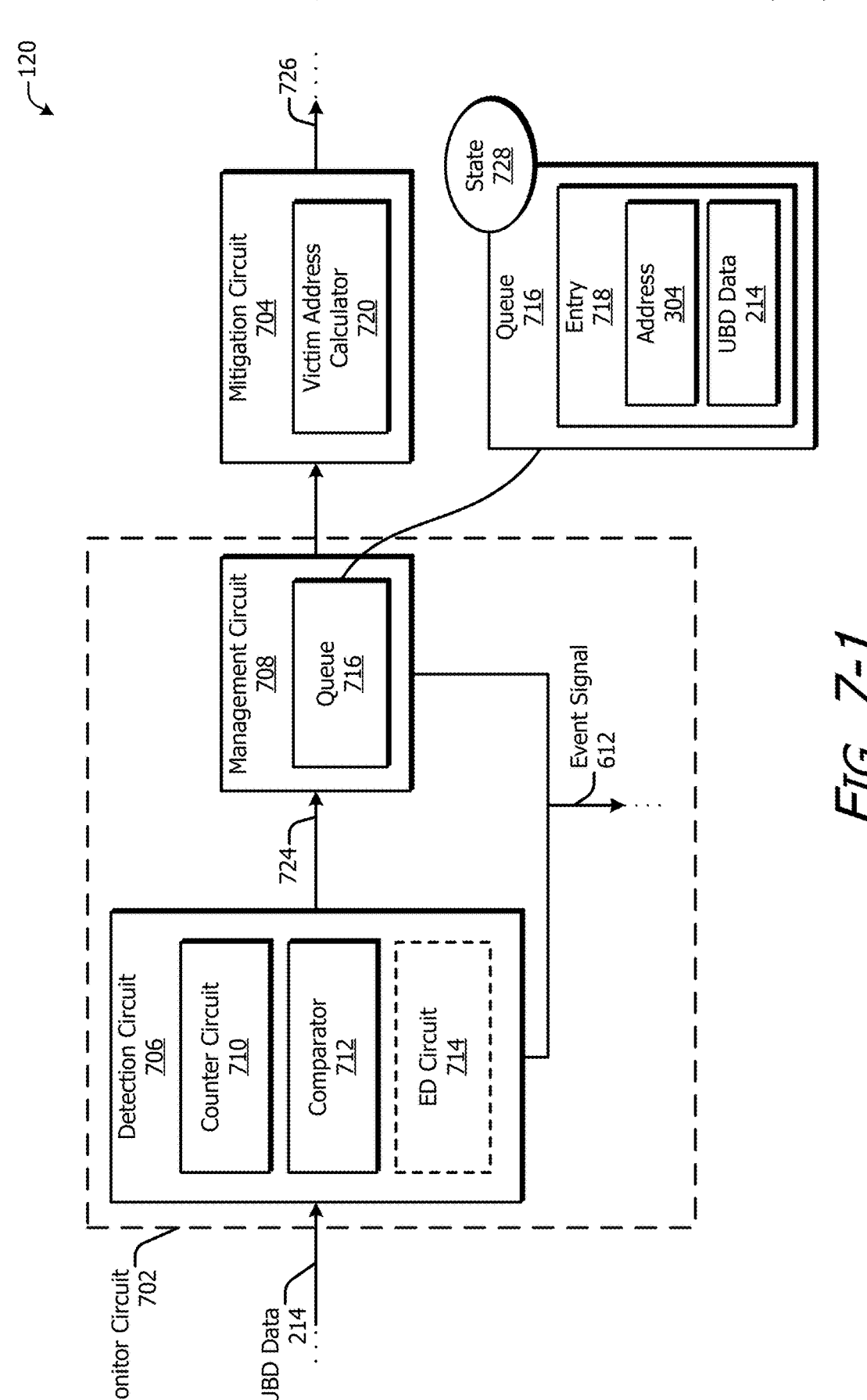
Figures 2, 7:
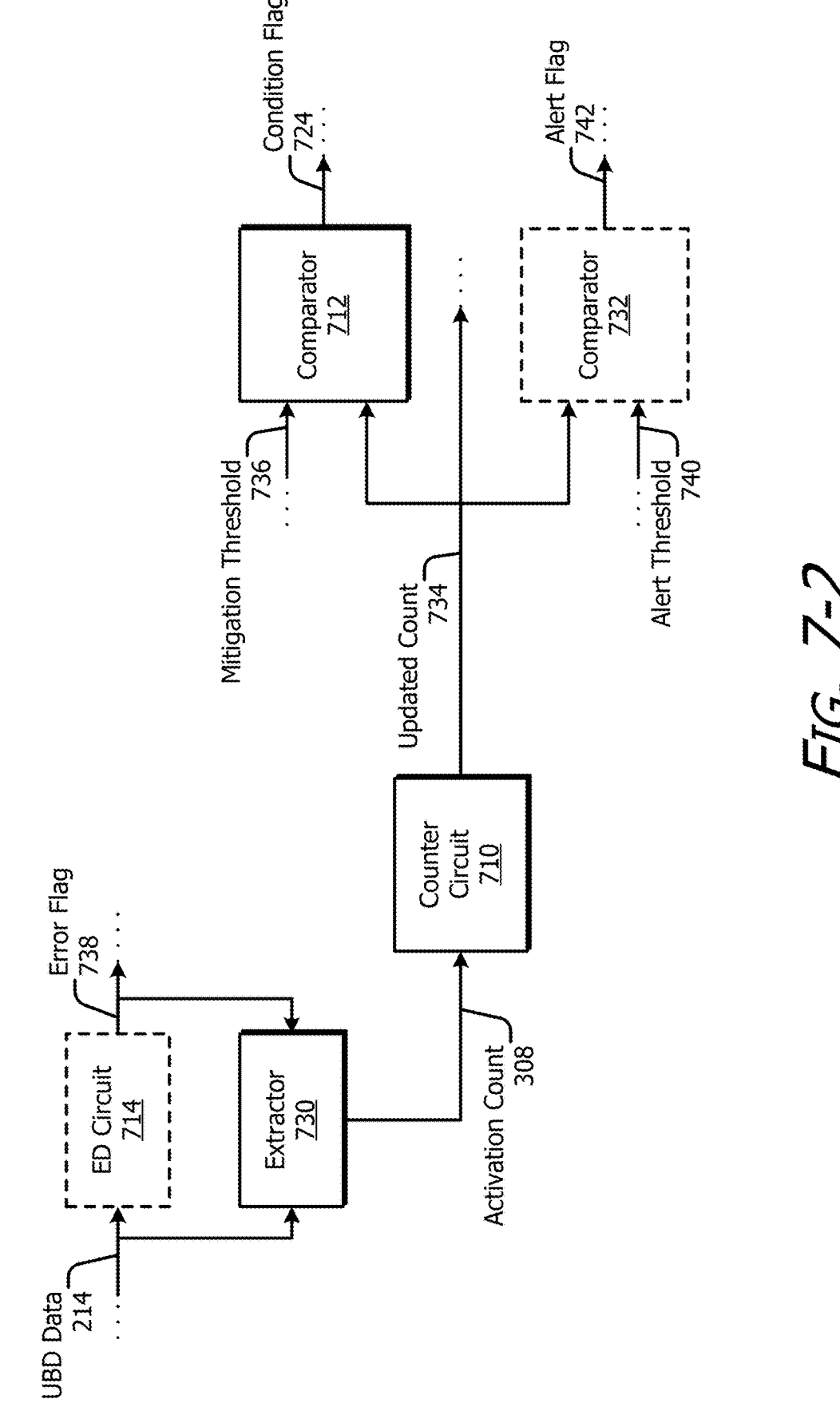

FIG. 1 illustrates, at 100 generally, an example operating environment including an apparatus 102 that can perform aspects of reporting multiple events associated with mitigating usage-based disturbance. The apparatus 102 can include various types of electronic devices, including an internet-of-things (IoT) device 102-1, tablet device 102-2, smartphone 102-3, notebook computer 102-4, passenger vehicle 102-5, server computer 102-6, and server cluster 102-7 that may be part of cloud computing infrastructure, a data center, or a portion thereof (e.g., a printed circuit board (PCB)). Other examples of the apparatus 102 include a wearable device (e.g., a smartwatch or intelligent glasses), entertainment device (e.g., a set-top box, video dongle, smart television, a gaming device), desktop computer, motherboard, server blade, consumer appliance, vehicle, drone, industrial equipment, security device, sensor, or the electronic components thereof. Each type of apparatus can include one or more components to provide computing functionalities or features.

In example implementations, the apparatus 102 can include at least one host device 104, at least one interconnect 106, and at least one memory device 108. The host device 104 can include at least one processor 110, at least one cache memory 112, and a memory controller 114. The memory device 108, which can also be realized with a memory module, can include, for example, a dynamic random-access memory (DRAM) die or module (e.g., Low-Power Double Data Rate synchronous DRAM (LPDDR SDRAM)). The DRAM die or module can include a three-dimensional (3D) stacked DRAM device, which may be a high-bandwidth memory (HBM) device or a hybrid memory cube (HMC) device. The memory device 108 can operate as a main memory for the apparatus 102. Although not illustrated, the apparatus 102 can also include storage memory. The storage memory can include, for example, a storage-class memory device (e.g., a flash memory, hard disk drive, solid-state drive, phase-change memory (PCM), or memory employing 3D XPoint™).

The processor 110 is operatively coupled to the cache memory 112, which is operatively coupled to the memory controller 114. The processor 110 is also coupled, directly or indirectly, to the memory controller 114. The host device 104 may include other components to form, for instance, a system-on-a-chip (SoC). The processor 110 may include a general-purpose processor, central processing unit, graphics processing unit (GPU), neural network engine or accelerator, application-specific integrated circuit (ASIC), field-programmable gate array (FPGA) integrated circuit (IC), or communications processor (e.g., a modem or baseband processor).

In operation, the memory controller 114 can provide a high-level or logical interface between the processor 110 and at least one memory (e.g., an external memory). The memory controller 114 may be realized with any of a variety of suitable memory controllers (e.g., a double-data-rate (DDR) memory controller that can process requests for data stored on the memory device 108). Although not shown, the host device 104 may include a physical interface (PHY) that transfers data between the memory controller 114 and the memory device 108 through the interconnect 106. For example, the physical interface may be an interface that is compatible with a DDR PHY Interface (DFI) Group interface protocol. The memory controller 114 can, for example, receive memory requests from the processor 110 and provide the memory requests to external memory with appropriate formatting, timing, and reordering. The memory controller 114 can also forward to the processor 110 responses to the memory requests received from external memory.

The host device 104 is operatively coupled, via the interconnect 106, to the memory device 108. In some examples, the memory device 108 is connected to the host device 104 via the interconnect 106 with an intervening buffer or cache. The memory device 108 may operatively couple to storage memory (not shown). The host device 104 can also be coupled, directly or indirectly via the interconnect 106, to the memory device 108 and the storage memory. The interconnect 106 and other interconnects (not illustrated in FIG. 1) can transfer data between two or more components of the apparatus 102. Examples of the interconnect 106 include a bus (e.g., a unidirectional or bidirectional bus), switching fabric, or one or more wires that carry voltage or current signals. The interconnect 106 can propagate one or more communications 116 between the host device 104 and the memory device 108. For example, the host device 104 may transmit a memory request to the memory device 108 over the interconnect 106. Also, the memory device 108 may transmit a corresponding memory response to the host device 104 over the interconnect 106.

The illustrated components of the apparatus 102 represent an example architecture with a hierarchical memory system. A hierarchical memory system may include memories at different levels, with each level having memory with a different speed or capacity. As illustrated, the cache memory 112 logically couples the processor 110 to the memory device 108. In the illustrated implementation, the cache memory 112 is at a higher level than the memory device 108. A storage memory, in turn, can be at a lower level than the main memory (e.g., the memory device 108). Memory at lower hierarchical levels may have a decreased speed but increased capacity relative to memory at higher hierarchical levels.

The apparatus 102 can be implemented in various manners with more, fewer, or different components. For example, the host device 104 may include multiple cache memories (e.g., including multiple levels of cache memory) or no cache memory. In other implementations, the host device 104 may omit the processor 110 or the memory controller 114. A memory (e.g., the memory device 108) may have an "internal" or "local" cache memory. As another example, the apparatus 102 may include cache memory between the interconnect 106 and the memory device 108. Computer engineers can also include any of the illustrated components in distributed or shared memory systems.

Computer engineers may implement the host device 104 and the various memories in multiple manners. In some cases, the host device 104 and the memory device 108 can be disposed on, or physically supported by, a printed circuit board (e.g., a rigid or flexible motherboard). The host device 104 and the memory device 108 may additionally be integrated together on an integrated circuit or fabricated on separate integrated circuits and packaged together. The memory device 108 may also be coupled to multiple host devices 104 via one or more interconnects 106 and may respond to memory requests from two or more host devices 104. Each host device 104 may include a respective memory controller 114, or the multiple host devices 104 may share a memory controller 114. This document describes with reference to FIG. 1 an example computing system architecture having at least one host device 104 coupled to a memory device 108.

Two or more memory components (e.g., modules, dies, banks, or bank groups) can share the electrical paths or couplings of the interconnect 106. The interconnect 106 can include at least one command-and-address bus (CA bus) and at least one data bus (DQ bus). The command-and-address bus can transmit addresses and commands from the memory controller 114 of the host device 104 to the memory device 108, which may exclude propagation of data. The data bus can propagate data between the memory controller 114 and the memory device 108. The memory device 108 may also be implemented as any suitable memory including, but not limited to, DRAM, SDRAM, three-dimensional (3D) stacked DRAM, DDR memory, or LPDDR memory (e.g., LPDDR DRAM or LPDDR SDRAM).

The memory device 108 can form at least part of the main memory of the apparatus 102. The memory device 108 may, however, form at least part of a cache memory, a storage memory, or a system-on-chip of the apparatus 102. The memory device 108 includes at least one usage-based-disturbance circuit 120 (UBD circuit 120). The usage-based-disturbance circuit 120 mitigates usage-based disturbance for one or more banks associated with the memory device 108. This includes detecting a condition associated with usage-based disturbance and initiating a refresh of one or more victim rows associated with the detected condition.

The memory device 108 also includes at least one event reporting circuit 122. The event reporting circuit 122 performs aspects of reporting multiple events associated with mitigating usage-based disturbance. In some implementations, the event reporting circuit 122 can also report events associated with normal operations, such as errors detected within the normal data. The event reporting circuit 122 associates the various events with predefined event categories, which are further described with respect to FIGS. 8 to 9-2. These event categories are also known by the memory controller 114. By reporting multiple events by category, the memory device 108 empowers the memory controller 114 to take appropriate action based on the event category to efficiently manage available resources for mitigating usage-based-disturbance. An example operation of the event reporting circuit 122 is further described with respect to FIG. 11. The usage-based-disturbance circuit 120 and the event reporting circuit 122 can each be implemented using software, firmware, hardware, fixed logic circuitry, or some combinations thereof.

In example implementations, the usage-based-disturbance circuit 120 is implemented at a local-bank level 124 (or a local level). This means that each instance of the usage-based-disturbance circuit 120 is associated with a particular bank or a particular set of banks. In contrast, the event reporting circuit 122 is implemented at a global-bank level 126 (e.g., a global level or a central level). This means that one instance of the event reporting circuit 122 implemented at the global-bank level 126 can interface with two or more usage-based-disturbance circuits 120 that are implemented at the local-bank level 124. The relationship between the local-bank level 124 and the global-bank level 126 is further described with respect to FIG. 5. Other components of the memory device 108 are further described with respect to FIG. 2.

FIG. 2 illustrates an example computing system 200 that can implement aspects of reporting multiple events associated with mitigating usage-based disturbance. In some implementations, the computing system 200 includes at least one memory device 108, at least one interconnect 106, and at least one processor 202. The memory device 108 can include, or be associated with, at least one memory array 204, at least one interface 206, and control circuitry 208 (or periphery circuitry) operatively coupled to the memory array 204. The memory array 204 can include an array of memory cells, including but not limited to memory cells of DRAM, SDRAM, three-dimensional (3D) stacked DRAM, DDR memory, LPDDR SDRAM, and so forth. The memory array 204 and the control circuitry 208 may be components on a single semiconductor die or on separate semiconductor dies. The memory array 204 or the control circuitry 208 may also be distributed across multiple dies. This control circuitry 208 may manage traffic on a bus that is separate from the interconnect 106.

The control circuitry 208 can include various components that the memory device 108 can use to perform various operations. These operations can include communicating with other devices, managing memory performance, performing refresh operations (e.g., self-refresh operations or auto-refresh operations), and performing memory read or write operations. In the depicted configuration, the control circuitry 208 includes the usage-based-disturbance circuit 120, the event reporting circuit 122, at least one array control circuit 210, and at least one instance of clock circuitry 212. In some implementations, the usage-based-disturbance circuit 120 and the event reporting circuit 122 are part of the control circuitry 208, as shown in FIG. 2. In other implementations, the usage-based-disturbance circuit 120 and/or the event reporting circuit 122 are considered separate from the control circuitry 208.

The array control circuit 210 can include circuitry that provides command decoding, address decoding, input/output functions, amplification circuitry, power supply management, power control modes, and other functions. The clock circuitry 212 can synchronize various memory components with one or more external clock signals provided over the interconnect 106, including a command-and-address clock or a data clock. The clock circuitry 212 can also use an internal clock signal to synchronize memory components and may provide timer functionality.

The usage-based-disturbance circuit 120 can be coupled to a set of memory cells within the memory array 204 that store usage-based-disturbance data 214 (UBD data 214). The usage-based-disturbance data 214 can include information such as an activation count, which represents a quantity of times one or more rows within the memory array 204 have been activated (or accessed) by the memory device 108. In example implementations, each row of the memory array 204 includes a subset of memory cells that stores the usage-based-disturbance data 214 associated with that row, as further described with respect to FIG. 3.

The interface 206 can couple the control circuitry 208 or the memory array 204 directly or indirectly to the interconnect 106. In some implementations, the usage-based-disturbance circuit 120, the event reporting circuit 122, the array control circuit 210, and the clock circuitry 212 can be part of a single component (e.g., the control circuitry 208). In other implementations, one or more of the usage-based-disturbance circuit 120, the event reporting circuit 122, the array control circuit 210, or the clock circuitry 212 may be implemented as separate components, which can be provided on a single semiconductor die or disposed across multiple semiconductor dies. These components may individually or jointly couple to the interconnect 106 via the interface 206.

The interconnect 106 may use one or more of a variety of interconnects that communicatively couple together various components and enable commands, addresses, or other information and data to be transferred between two or more components (e.g., between the memory device 108 and the processor 202). Although the interconnect 106 is illustrated with a single line in FIG. 2, the interconnect 106 may include at least one bus, at least one switching fabric, one or more wires or traces that carry voltage or current signals, at least one switch, one or more buffers, and so forth. Further, the interconnect 106 may be separated into at least a command-and-address bus and a data bus.

In some aspects, the memory device 108 may be a "separate" component relative to the host device 104 (of FIG. 1) or any of the processors 202. The separate components can include a printed circuit board, memory card, memory stick, and memory module (e.g., a single in-line memory module (SIMM) or dual in-line memory module (DIMM)). Thus, separate physical components may be located together within the same housing of an electronic device or may be distributed over a server rack, a data center, and so forth. Alternatively, the memory device 108 may be integrated with other physical components, including the host device 104 or the processor 202, by being combined on a printed circuit board or in a single package or a system-on-chip.

As shown in FIG. 2, the processors 202 may include a computer processor 202-1, a baseband processor 202-2, and an application processor 202-3, coupled to the memory device 108 through the interconnect 106. The processors 202 may include or form a part of a central processing unit, graphics processing unit, system-on-chip, application-specific integrated circuit, or field-programmable gate array. In some cases, a single processor can comprise multiple processing resources, each dedicated to different functions (e.g., modem management, applications, graphics, central processing). In some implementations, the baseband processor 202-2 may include or be coupled to a modem (not illustrated in FIG. 2) and referred to as a modem processor. The modem or the baseband processor 202-2 may be coupled wirelessly to a network via, for example, cellular, Wi-Fi™, Bluetooth™, near field, or another technology or protocol for wireless communication.

In some implementations, the processors 202 may be connected directly to the memory device 108 (e.g., via the interconnect 106). In other implementations, one or more of the processors 202 may be indirectly connected to the memory device 108 (e.g., over a network connection or through one or more other devices). The memory array 204 is further described with respect to FIG. 3.

Figure 3:
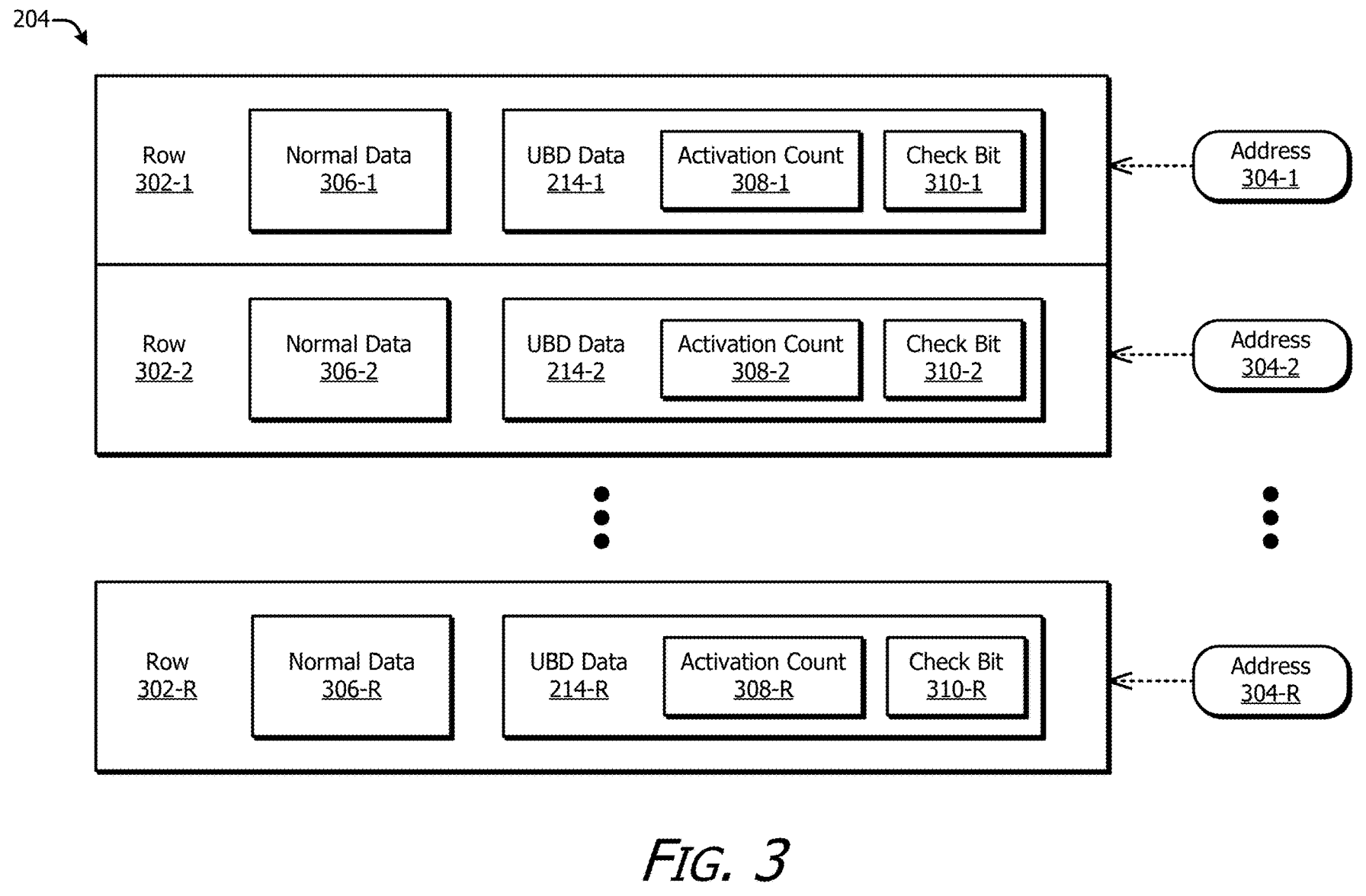

FIG. 3 illustrates example data stored within rows of the memory array 204. The memory array 204 includes multiple rows 302 of memory cells. For example, the memory array 204 depicted in FIG. 3 includes rows 302-1, 302-2. 302-R, where R represents a positive integer. Each row 302 is associated with an address 304 (e.g., a row address, a memory row address, or a memory address). For example, the first row 302-1 has a first address 304-1, the second row 302-2 has a second address 304-2, and an $R^{th}$ row 302-R has an $R^{th}$ address 304-R.

Each of the rows 302 can store normal data 306 within a first subset of the memory cells associated with that row 302. The normal data 306 represents data that is read from or written to the memory device 108 during normal memory operations (e.g., during normal read or write operations). The normal data 306, for example, can include data that is transmitted by the memory controller 114 and is written to one or more rows 302 of the memory array 204.

In addition to the normal data 306, each of the rows 302 can store usage-based-disturbance data 214 within a second subset of the memory cells associated with that row 302. The usage-based-disturbance data 214 includes information that enables the usage-based-disturbance circuit 120 to mitigate usage-based disturbance. In an example implementation, the usage-based-disturbance data 214 includes an activation count 308. With the activation count 308, the memory device 108 can keep track of a quantity of accesses or activations of the corresponding memory row 302. In some example implementations, the usage-based-disturbance data 214 can also include a count of how many times a neighboring row (e.g., an adjacent or a proximate row) is refreshed in order to mitigate usage-based disturbance. Each of these counts provide an example means by which the memory device 108 can monitor for usage-based disturbance and determine when to refresh victim rows to reduce the risk of usage-based disturbance corrupting data.

In the example shown in FIG. 3, the first row 302-1 stores first normal data 306-1 within a first subset of memory cells of the first row 302-1 and stores first usage-based-disturbance data 214-1 within a second subset of memory cells of the first row 302-1. The first usage-based-disturbance data 214-1 includes a first activation count 308-1, which represents a quantity of times the first row 302-1 has been activated since a last refresh. As another example, the second row 302-2 stores second normal data 306-2 within a first subset of memory cells within the second row 302-2 and stores second usage-based-disturbance data 214-2 within a second subset of memory cells within the second row 302-2. The second usage-based-disturbance data 214-2 includes a second activation count 308-2, which represents a quantity of times the second row 302-2 has been activated since a last refresh. Additionally, the $R^{th}$ row 302-R stores $R^{th}$ normal data 306-R within a first subset of memory cells within the $R^{th}$ row 302-R and stores $R^{th}$ usage-based-disturbance data 214-R within a second subset of memory cells within the $R^{th}$ row 302-R. The $R^{th}$ usage-based-disturbance data 214-R includes an $R^{th}$ activation count 308-R, which represents a quantity of times the $R^{th}$ row 302-R has been activated since a last refresh.

The usage-based-disturbance data 214 can also include information or can be formatted (e.g., coded) in such a way as to support error detection. In this example, the usage-based-disturbance data 214 includes a check bit 310, such as a parity check bit or error-correcting-code check bits. In particular, the usage-based-disturbance data 214-1, 214-2, and 214-R respectively include check bits 310-1, 310-2, and 310-R. Other implementations are also possible in which the usage-based-disturbance data 214 is coded in a manner that supports any of the error detection tests described above, such as the error-correcting-code check. Although the techniques for detecting a condition associated with usage-based disturbance is generally described with respect to the activation count 308, these techniques can generally be applied to detecting a condition based on any type of information that is represented by the usage-based-disturbance data 214, including error detection techniques.

Example Techniques and Hardware

Figure 4:
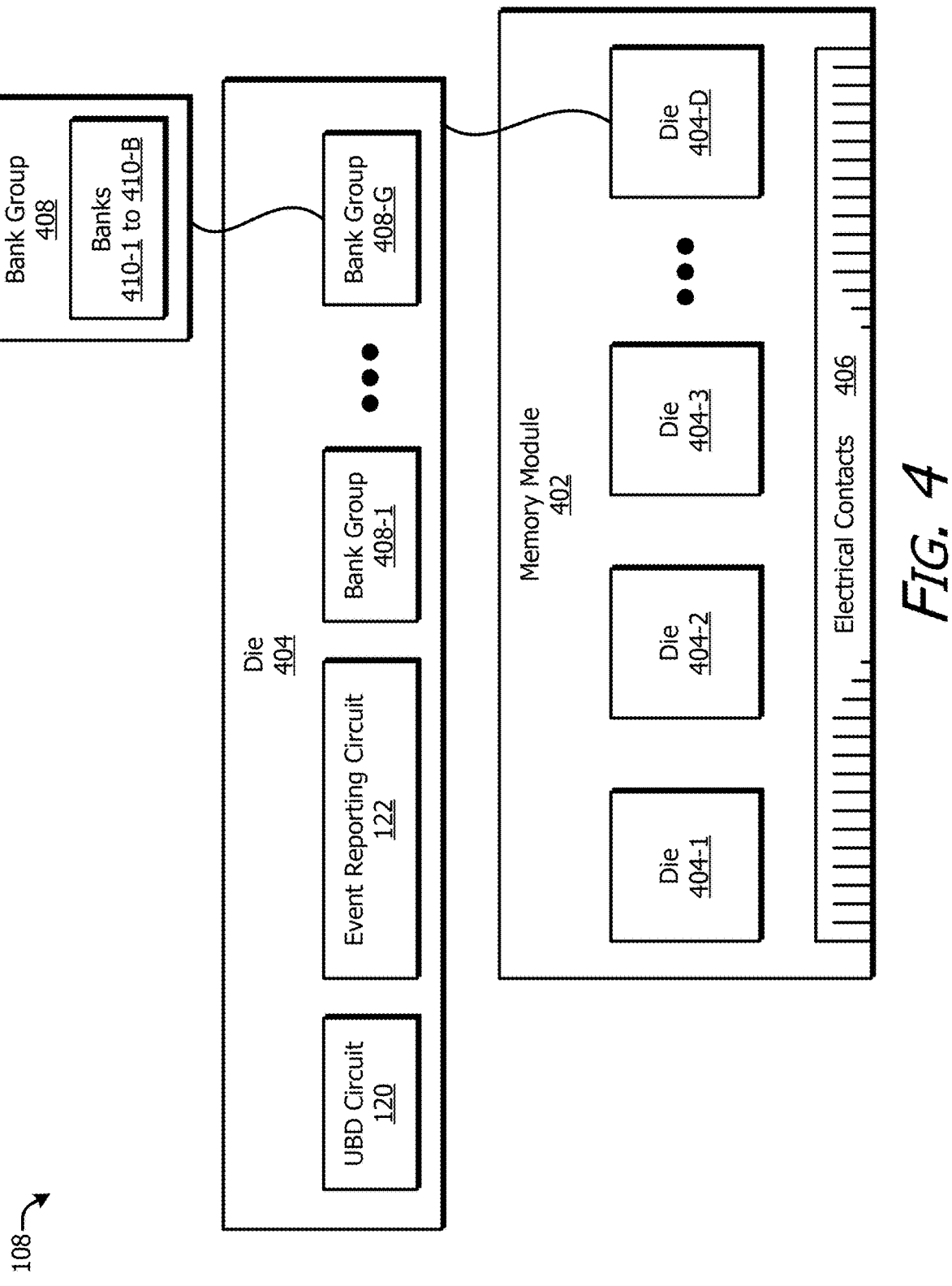
FIG. 4 illustrates an example memory device in which aspects of reporting multiple events associated with mitigating usage-based disturbance can be implemented.

FIG. 4 illustrates an example memory device 108 in which aspects of reporting multiple events associated with mitigating usage-based disturbance can be implemented. The memory device 108 includes a memory module 402, which can include multiple dies 404. As illustrated, the memory module 402 includes a first die 404-1, a second die 404-2, a third die 404-3, and a $D^{th}$ die 404-D, with D representing a positive integer. The memory module 402 can be a SIMM or a DIMM. As another example, the memory module 402 can interface with other components via a bus interconnect (e.g., a Peripheral Component Interconnect Express (PCIe®) bus). The memory device 108 illustrated in FIGS. 1 and 2 can correspond, for example, to multiple dies (or dice) 404-1 through 404-D, or a memory module 402 with two or more dies 404. As shown, the memory module 402 can include one or more electrical contacts 406 (e.g., pins) to interface the memory module 402 to other components.

The memory module 402 can be implemented in various manners. For example, the memory module 402 may include a printed circuit board, and the multiple dies 404-1 through 404-D may be mounted or otherwise attached to the printed circuit board. The dies 404 (e.g., memory dies) may be arranged in a line or along two or more dimensions (e.g., forming a grid or array). The dies 404 may have a similar size or may have different sizes. Each die 404 may be similar to another die 404 or different in size, shape, data capacity, or control circuitries. The dies 404 may also be positioned on a single side or on multiple sides of the memory module 402.

One or more of the dies 404-1 to 404-D include the usage-based-disturbance circuit 120, the event reporting circuit 122, and bank groups 408-1 to 408-G, with G representing a positive integer. Each bank group 408 includes at least two banks 410, such as banks 410-1 to 410-B, with B representing a positive integer. In some implementations, the die 404 includes multiple instances of the usage-based-disturbance circuit 120, which mitigate usage-based disturbance across at least one of the banks 410. For example, multiple instances of the usage-based-disturbance circuit 120 can respectively mitigate usage-based disturbance across the bank groups 408-1 to 408-G.

In other implementations, multiple instances of the usage-based-disturbance circuit 120 can respectively mitigate usage-based disturbance for respective banks 410. In this case, each usage-based-disturbance circuit 120 mitigates usage-based disturbance for a single bank 410 within one of the bank groups 408-1 to 408-B. In yet other example implementations, each usage-based-disturbance circuit 120 mitigates usage-based disturbance for a subset of the banks 410 associated with one of the bank groups 408-1 to 408-G, where the subset of the banks 410 includes at least two banks 410.

Various implementations of the event reporting circuit 122 are also possible. In a first example, the die 404 includes a single event reporting circuit 122 that is coupled to the one or more instances of the usage-based-disturbance circuit 120. In a second example, the die 404 includes multiple event reporting circuit 122 that are coupled to respective sets of one or more usage-based-disturbance circuits 120.

The die 404 can include a single instance of the event reporting circuit 122, which is coupled to the one or more instances of the usage-based-disturbance circuit 120. The relationship between the banks 410-1 to 410-B, the usage-based-disturbance circuit 120, and the event reporting circuit 122 are further described with respect to FIG. 5.

Figure 5:
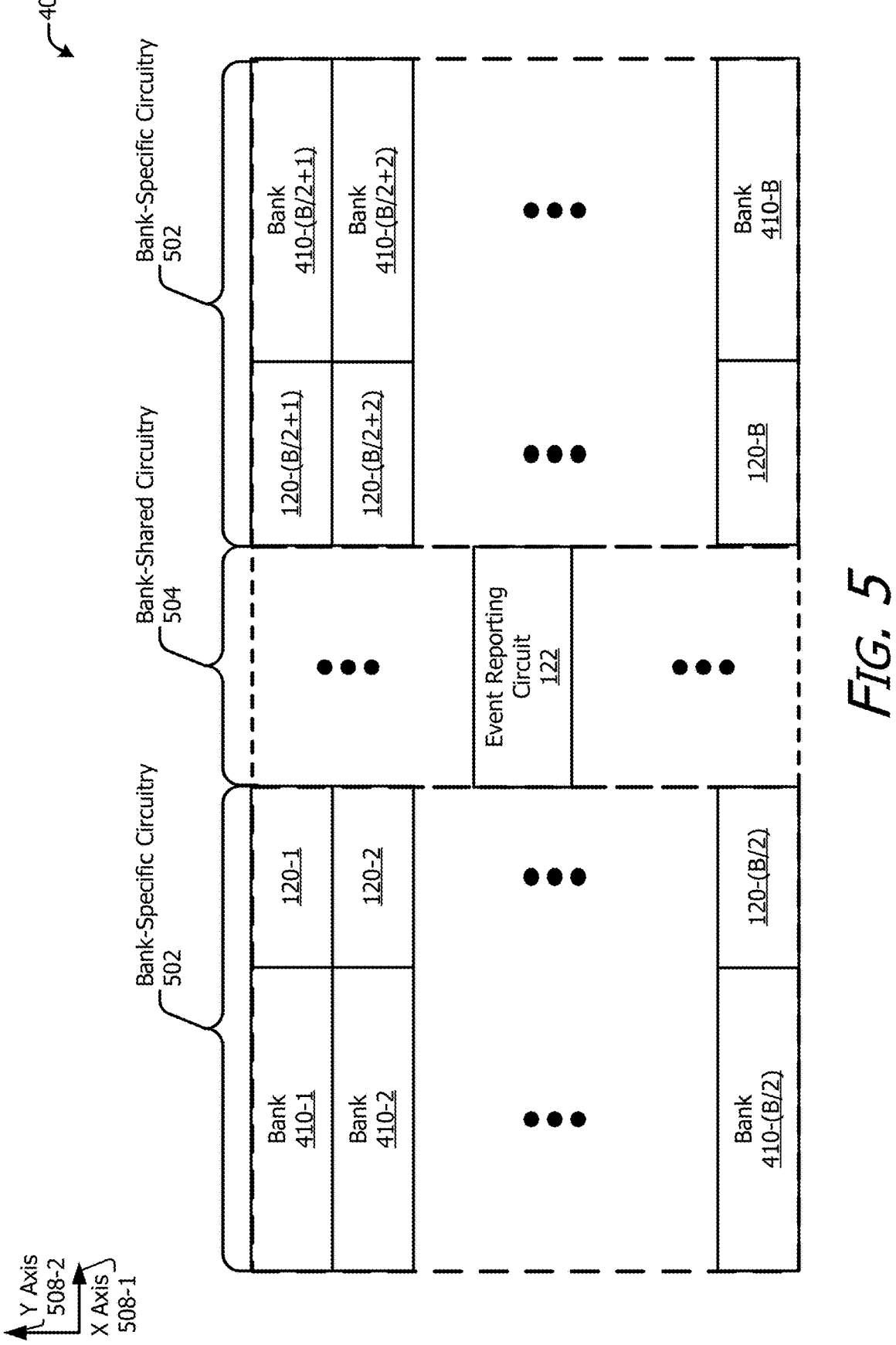
FIG. 5 illustrates an example arrangement of circuits that can implement aspects of reporting multiple events associated with mitigating usage-based disturbance.

FIG. 5 illustrates an example arrangement of multiple instances of the usage-based-disturbance circuit 120 on a die 404. The die 404 includes bank-specific circuitry 502 and bank-shared circuitry 504. Bank-specific circuitry 502 includes components that are associated with a particular bank 410. For example, the bank-specific circuitry 502 includes the banks 410-1, 410-2 . . . 410-(B/2), 410-(B/2+1), 410-(B/2+2) . . . 410-B and the usage-based-disturbance circuits 120-1, 120-2 . . . 120-(B/2), 120-(B/2+1), 120-(B/2+2) . . . 120-B. The usage-based-disturbance circuits 120-1 to 120-B are respectively coupled to the banks 410-1 to 410-B. In some cases, subsets of the banks 410-1 to 410-B are associated with different bank groups 408. In an example implementation, the die 404 includes 32 banks 410 (e.g., B equals 32). The 32 banks 410 form eight bank groups 408 (e.g., G equals 8), with each bank group 408 including four of the banks 410. In other cases, the banks 410-1 to 410-B are associated with a single bank group 408.

The bank-shared circuitry 504 includes components that are associated with multiple banks 410. These components perform operations associated with multiple banks 410. Example components of the bank-shared circuitry 504 include the event reporting circuit 122.

On the die 404, the bank-specific circuitry 502 is positioned on two opposite sides of the bank-shared circuitry 504. Explained another way, the bank-shared circuitry 504 can be centrally positioned on the die 404. As such, the event reporting circuit 122 can be positioned closer to a center of the die 404 compared to the edges of the die 404. Positioning the bank-shared circuitry 504 in the center enables routing between the bank-shared circuitry 504 and the bank-specific circuitry 502 to be simplified.

Consider a first axis 508-1 (e.g., X axis 508-1) and a second axis 508-2 (e.g., Y axis 508-2), which is perpendicular to the first axis 508-1. In FIG. 5, the first axis 508-1 is depicted as a "horizontal" axis, and the second axis 508-2 is depicted as a "vertical" axis. Components of the bank-shared circuitry 504 are distributed across the second axis 508-2. A first set of the banks (e.g., banks 410-1 to 410-B/2) are arranged along the second axis 508-2 on a "left" side of the bank-shared circuitry 504, and a second set of the banks (e.g., banks 410-(B/2+1) to 410-B) are arranged along the second axis 508-2 on a "right" side of the bank-shared circuitry 504. The usage-based-disturbance circuits 120-1 to 120-B are positioned between the corresponding banks 410-1 to 410-B and the bank-shared circuitry 504. By positioning the event reporting circuit 122 in a central location between the usage-based-disturbance circuits 120-1 to 120-B, it can be easier to route signals between the event reporting circuit 122 and the usage-based-disturbance circuits 120-1 to 120-B. A relationship between the usage-based-disturbance circuit 120 and the event reporting circuit 122 is further described with respect to FIG. 6.

Figure 6:
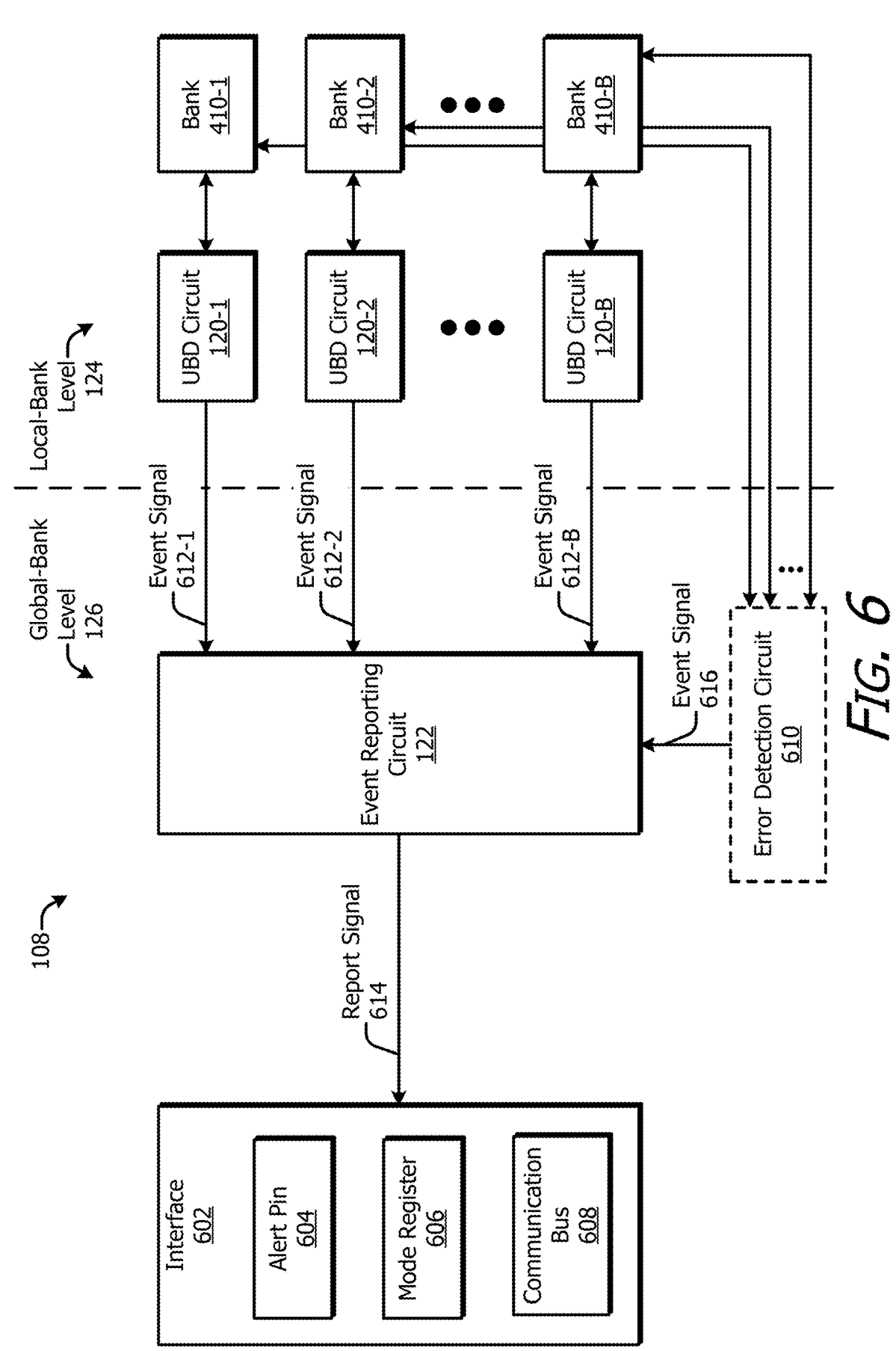
FIG. 6 illustrates an example memory device coupled to an interface that can implement aspects of reporting multiple events associated with mitigating usage-based disturbance.

FIG. 6 illustrates an example memory device 108 capable of reporting multiple events associated with mitigating usage-based disturbance. Components of the memory device 108 are depicted with respect to the local-bank level 124, which is illustrated on a right side of FIG. 6, and the global-bank level 126, which is illustrated on a left side of FIG. 6. At the local-bank level 124, the memory device 108 includes the banks 410-1 to 410-B and the usage-based-disturbance circuits 120-1 to 120-B, which are respectively coupled to the banks 410-1 to 410-B.

At the global-bank level 126, the memory device 108 includes the event reporting circuit 122, which is coupled to the usage-based-disturbance circuits 120-1 to 120-B. The event reporting circuit 122 is also coupled to an interface 602, which may or may not be considered part of the memory device 108. The interface 602 can include the interconnect 106 of FIGS. 1 and 2, the interface 206 of FIG. 2, the electrical contacts 406 of FIG. 4, or some combination thereof. In general, the interface 602 enables the event reporting circuit 122 to communicate with the memory controller 114 (e.g., the host device 104). More specifically, the interface 602 enables the event reporting circuit 122 to report various events to the memory controller 114. In example implementations, the interface 602 can include at least one alert pin 604, at least one mode register 606, and/or at least one communication bus 608. The interface 602 enables the event reporting circuit 122 to report multiple events associated with mitigating usage-based disturbance using at least one of the alert pin 604, the mode register 606, the communication bus 608, or some combination thereof.

The alert pin 604 represents at least one of the electrical contacts 406 through which the memory device 108 can communicate information to the memory controller 114. The alert pin 604 enables an occurrence of an event to be quickly and directly communicated to the memory controller 114. In some implementations, the alert pin 604 is also used to report errors associated with the normal data 306.

The mode register 606 includes at least one operand that can be set by the event reporting circuit 122. The mode register 606 can be read by the memory controller 114 through a mode register read (MRR) command. As such, there can be a delay between a time that the memory device 108 reports an occurrence of an event and a time that the memory controller 114 reads the mode register 606 to receive the report. The mode register 606, however, provide further flexibility in enabling other information about an event to be communicated to the memory controller 114.

The communication bus 608 can include the data bus or an improved inter-integrated circuit (I3C) bus using a side-band-based protocol. The communication bus 608 enables an occurrence of an event to be directly communicated to the memory controller 114. Compared to the alert pin 604, the communication bus 608 may be slower at communicating this information, particularly in situations in which the communication bus 608 is busy. However, the communication bus 608 provides further flexibility in communicating other information about an event in addition to indicating an occurrence of the event.

The memory device 108 can optionally include an error detection circuit 610, which is coupled to the banks 410-1 to 410-B and the event reporting circuit 122. The error detection circuit 610 can access (e.g., read) the normal data 306 that is stored within the banks 410-1 to 410-B. In example implementations, the error detection circuit 610 can detect and/or correct one or more errors associated with the normal data 306. In some implementations, the error detection circuit 610 is implemented as a test engine, an error-check and scrub engine (ECS engine), an add-based engine, or a refresh engine. The error detection circuit 610 can be an existing engine within the memory device 108 that performs other functions not associated with usage-based-disturbance mitigation.

In some implementations, the error detection circuit 610 accesses each row of the memory array 204 in a controlled manner or in a particular sequence. The manner in which the error detection circuit 610 accesses the rows 302 of the memory array 204 can be in accordance with an automatic mode or a manual mode. Generally, given sufficient time, the error detection circuit 610 accesses all rows 302 of the memory array 204. In some implementations, the error detection circuit 610 accesses the rows 302 of the memory array 204 in a periodic or cyclic manner. An order in which the error detection circuit 610 accesses the rows 302 can be in a predetermined order, a rule-based order, or a randomized order.

During operation, the usage-based-disturbance circuits 120 mitigate usage-based disturbance within corresponding banks 410. This includes monitoring for a condition associated with usage-based disturbance, detecting the condition, and initiating a refresh of one or more victim rows associated with the detected condition, as further described with respect to FIG. 7-1. To monitor for the condition, the usage-based-disturbance circuit 120 can perform an array counter update (ACU) procedure, which is further described with respect to FIG. 7-2.

While performing these operations, the usage-based-disturbance circuit 120 can detect an occurrence of an event associated with mitigating usage-based disturbance. The event can represent a status or a state of the memory device 108 for mitigating usage-based disturbance. The type of event can indicate whether the memory device 108 is being given a sufficient quantity of refresh commands from the memory controller 114 or if there is an increased probability of an alert condition occurring. Generally speaking, the usage-based-disturbance circuit 120 can detect a variety of events, which are associated with different event categories, as further described with respect to FIGS. 8 and 9-1.

The usage-based-disturbance circuits 120-1, 120-2, and 120-B respectively generate event signals 612-1, 612-2, and 612-B. With the event signals 612, each usage-based-disturbance circuit 120 can indicate to the event reporting circuit 122 the detection of an event. In some implementations, the event signals 612 are directly communicated from each of the usage-based-disturbance circuits 120 to the event reporting circuit 122. In other implementations, the event signals 612 can be combined at the local-bank level 124 and a composite event signal can be passed to the event reporting circuit 122 at the global-bank level 126. For some events, additional information about the event can be communicated directly or indirectly from the local-bank level 124 to the global-bank level 126.

The event reporting circuit 122 generates a report signal 614 based on the event signals 612. In some implementations, the report signal 614 is implemented using the reliability, availability, and serviceability (RAS) event signal or another alert signal. The report signal 614 can report multiple events associated with mitigating usage-based disturbance to enable and/or cause the memory controller 114 to take an appropriate action. Example actions are further described with respect to FIGS. 8 and 9-1.

For implementations of the memory device 108 that include the error detection circuit 610, the error detection circuit 610 can detect errors within the normal data 306. The error detection circuit 610 generates an event signal 616, which can indicate whether or not an error is detected. In this case, the event reporting circuit 122 can generate the report signal 614 based on the event signals 612 provided by the usage-based-disturbance circuits 120 as well as based on the event signal 616 provided by the error detection circuit 610. The event reporting circuit 122 generates the report signal 614 in a manner that enables the memory controller 114 to determine the type of event that occurred (e.g., to determine an event category associated with the event). In this way, the memory controller 114 can detect the occurrences of different types of events (e.g., the occurrence of events associated with different event categories).

The interface 602 passes the report signal 614 (or passes the information carried by the report signal 614) to the memory controller 114 using at least one of the alert pin 604, the mode register 606, and/or the communication bus 608. In some implementations, the interface 602 passes information about different events using a same component, such as the alert pin 604, the mode register 606, or the communication bus 608. This means that different types of events that are indicated by the event signals 612 are reported to the memory controller 114 in a similar manner. In other implementations, the interface 602 passes information about different events using different components. For example, an event associated with a first event category can be communicated to the memory controller 114 using a first component (e.g., the mode register 606), and an event associated with a second event category can be communicated to the memory controller 114 using a second component (e.g., the alert pin 604).

Although not explicitly shown in FIG. 6, the memory device 108 can include other components that enable additional information associated with the event signals 612 to be passed from the local-bank level 124 to the global-bank level 126. For example, the memory device 108 can include a latch circuit that enables an address that is logged at the local-bank level 124 to be indirectly logged at the global-bank level 126 without having the address routed directly from the local-bank level 124 to the global-bank level 126. This feature is referred to as indirect logging. Indirect logging utilizes the error detection circuit 610 to provide a controlled way of logging information (e.g., particularly the addresses 304 of rows 302) at the global-bank level 126. It also avoids conflicts that can otherwise arise if information associated with multiple event signals 612 are logged at the local-bank level 124 during a same time interval. With indirect logging, the memory device 108 can provide additional information about an event to the memory controller 114 without significantly increasing a complexity and/or cost of an interface (e.g., signal routing) between the local-bank level 124 and the global-bank level 126. Operations of the usage-based-disturbance circuit 120 are further described with respect to FIGS. 7-1 and 7-2.

FIG. 7-1 illustrates an example implementation of the usage-based-disturbance circuit 120. In general, the usage-based-disturbance circuit 120 can detect one or more conditions that may lead to or indicate the presence of usage-based disturbance and mitigate its effects. To monitor for these conditions, the usage-based-disturbance circuit 120 maintains and updates the usage-based-disturbance data 214 that is stored in the memory array 204. If the usage-based-disturbance data 214 indicates that one of the conditions is present, then the related victim rows may be at increased risk for data corruption due to the usage-based-disturbance effect. To manage this risk, the usage-based-disturbance circuit 120 can support the refreshing of these victim rows. In addition to detecting the presence of usage-based disturbance, some implementations of the usage-based-disturbance circuit 120 can also monitor for one or more errors associated with the usage-based-disturbance data 214.

In the depicted configuration, the usage-based-disturbance circuit 120 includes at least one monitor circuit 702 and at least one mitigation circuit 704. Although not explicitly shown, the monitor circuit 702 is coupled to the memory array 204. Through this coupling, the monitor circuit 702 can read the usage-based-disturbance data 214 associated with an activated row 302 and/or write updated usage-baseddisturbance data 214 for the activated row 302. The mitigation circuit 704 is coupled between the monitor circuit 702 and other circuitry capable of performing a refresh operation, such as the control circuitry 208 or other refresh circuitry.

The monitor circuit 702 can detect a condition associated with usage-based disturbance and monitor the detected condition until it is mitigated. In some implementations, the usage-based-disturbance circuit 120 includes multiple monitor circuits 702, which detect different types of conditions associated with usage-based disturbance. The monitor circuit 702 includes at least one detection circuit 706 and at least one management circuit 708. The detection circuit 706 can be implemented using at least one counter circuit 710 and at least one comparator 712. The counter circuit 710 enables the detection circuit 706 to update the usage-based-disturbance data 214.

The detection circuit 706 can optionally include (or can optionally be coupled to) an error detection circuit 714 (ED circuit 714). The error detection circuit 714 can detect and/or correct bit errors associated with the usage-based-disturbance data 214. The error detection circuit 714 can perform a variety of error detection tests to detect an error. Example tests include a parity bit check, an error-correcting-code check, a checksum check, and/or a cyclic redundancy check. The test can evaluate the check bit 310 of the usage-based-disturbance data 214 that corresponds with the activated row. For example, the error detection circuit 714 can perform a parity check based on the check bit 310.

The comparator 712, the error detection circuit 714, or some combination thereof can be used to monitor for and detect one or more reportable events associated with mitigating usage-based disturbance. Other techniques are also possible in which the usage-based-disturbance circuit 120 uses another type of analysis-type circuit to monitor for and detect an event. Other analysis-type circuits, for example, can analyze the activation of other neighboring rows or determine how often a neighboring row is refreshed due to usage-based-disturbance mitigation techniques.

The management circuit 708 keeps track of a condition that is to be mitigated once resources are available. In this example, the management circuit 708 includes at least one queue 716. The queue 716 can include one or more entries 718, which can store an address 304 of an aggressor row that is associated with an instance of the detected condition. In some cases, the entry 718 also includes the usage-based-disturbance data 214 that is related to the detected condition, such as the activation count 308 of the aggressor row.

The entries 718 within the queue 716 can be arranged and/or processed in a particular order, such as a first-in first-out (FIFO) order or a "worse case" order. In some cases, the priority-based order can be based on the activation count 308 such that higher-priority entries 718 have comparatively larger activation counts 308 as compared to those of lower-priority entries 718. In an example implementation, the queue 716 is implemented using content-addressable memory (CAM) or a plurality of registers. A size of the queue 716 (e.g., a quantity of entries 718 that can be stored) can vary depending on the implementation. In an example, the queue 716 can store up to 3, 5, or 10 entries 718.

The mitigation circuit 704 initiates and/or performs a mitigation procedure for a detected condition. An example mitigation procedure can include refreshing one or more rows 302 (e.g., one or more victim rows) that are impacted by the detected condition. It can also optionally include updating the usage-based-disturbance data 214, such as setting the usage-based-disturbance data 214 to a default state (e.g., setting the activation count 308 to a default value).

In this example, the mitigation circuit 704 includes at least one victim address calculator 720. The victim address calculator 720 identifies addresses of one or more victim rows that are to be refreshed based on an address 304 of an aggressor row. In some implementations, the victim rows that are determined by the victim address calculator 720 are based on the type of condition that is detected by the monitor circuit 702. In other implementations, an operation of the victim address calculator 720 can be controlled by the memory controller 114. In this case, the victim address calculator 720 can be coupled to a register (not shown). By setting an operand of the register, the memory controller 114 can cause the victim address calculator 720 to identify victim rows based on one or more different methods.

Consider an example in which the aggressor row is represented by row R. In a first example, the victim address calculator 720 identifies the one or more victim rows to include one or more rows 302 that are immediately adjacent to the aggressor row (e.g., the R+1 and/or R−1 rows). In a second example, the victim address calculator 720 identifies the one or more victim rows to include one or more rows 302 that are proximate to the aggressor row but not immediately adjacent to the aggressor row (e.g., the R+2, R—2, R+3, and/or R−3 rows 302 or some combination thereof). In a third example, the victim address calculator 720 identifies one or more adjacent rows and one or more proximate but non-adjacent rows.

During operation, the memory device 108 activates a row 302. The monitor circuit 702 monitors the usage-based-disturbance data 214 associated with the activated row 302 to determine whether or not a condition associated with usage-based disturbance is present. More specifically, the detection circuit 706 performs an array counter update procedure to monitor for and detect the condition. As part of the array counter update procedure or based on the occurrence of the array counter update procedure, the usage-based-disturbance circuit 120 uses the error detection circuit 714 to test for faulty usage-based-disturbance data 214 and/or to test for faulty memory cells that store the usage-based-disturbance data 214. The array counter update procedure is further described with respect to FIG. 7-2.

The detection circuit 706 generates a condition flag 724, which indicates whether or not a condition is detected. If a condition is detected, the condition flag 724 causes the management circuit 708 to add an entry 718 within the queue 716 to store the address 304 of the activated row 302, which represents an aggressor row. The management circuit 708 also stores the usage-based-disturbance data 214 associated with the activated row 302 (e.g., an updated activation count) as part of the entry 718.

In general, the condition represents any condition in which a refresh operation is to be performed to mitigate usage-based disturbance. The condition can be detected by the detection circuit 706, can cause the management circuit 708 to add an entry 718 to the queue 716, and/or can cause the mitigation circuit 704 to initiate a refresh operation. The condition can also be referred to as a usage-based-disturbance condition.

When a refresh command is issued and there are refresh pumps available for mitigating usage-based disturbance, the mitigation circuit 704 can accept information regarding an entry 718 from the management circuit 708. Based on the address 304 of the aggressor row that caused the detected condition, the victim address calculator 720 determines an address 726 of the one or more victim rows that are to be refreshed. The mitigation circuit 704 provides the one or more addresses 726 of the victim rows to other circuitry that performs the refresh operation.

While performing the operations described above, the detection circuit 706 and/or the management circuit 708 can detect various events associated with mitigating usage-based disturbance. The detection circuit 706 and/or the management circuit 708 generate the event signal 612, which is passed to the event reporting circuit 122. Some events are based on the detection circuit 706 detecting a condition associated with usage-based disturbance and the management circuit 708 creating an entry 718 in the queue 716. Other events are based on the error detection circuit 714 detecting an error in the usage-based-disturbance data 214. Still other events can relate to an alert condition, which can be detected by the detection circuit 706 and/or the management circuit 708. Example alert conditions are further described below.

An example first alert condition is associated with the usage-based-disturbance data 214. In this case, the detection circuit 706 and/or the management circuit 708 determine that the first alert condition occurs if an activation count 308 of a row 302 is greater than an alert threshold. This indicates that the activation count 308 is approaching an intrinsic specified limitation, which is to be avoided. An occurrence of the first alert condition can indicate that the usage-based-disturbance circuit 120 needs additional resources for refreshing victim rows and preventing the activation count 308 of the identified row from reaching the intrinsic specified limitation.

An example second alert condition is associated with a state 728 of the queue 716. In this case, the management circuit 708 can detect the second alert condition if the state 728 of the queue 716 indicates that the queue 716 is full (e.g., the state 728 represents a full state). This means that the usage-based-disturbance circuit 120 is behind in mitigating usage-based disturbance and additional refresh commands are necessary to refresh victim rows corresponding to the current entries 718.

When an alert condition occurs, the memory device 108 can execute an alert "back-off" (ABO) procedure. As part of the alert back-off procedure, the memory device 108 pauses normal operations for a recovery period during which refresh management (RFM) commands and other functions may be performed in the memory device 108 to mitigate usage-based disturbance. During this recovery period, the memory device 108 is inaccessible to a memory controller and a user while the victim rows are refreshed. The alert conditions can be associated with one type of event category, as further described with respect to FIGS. 8 and 9-1. Example operations of the detection circuit 706 are further described with respect to FIG. 7-2.

FIG. 7-2 illustrates an example implementation of the detection circuit 706. In the depicted configuration, the detection circuit 706 includes the counter circuit 710, the comparator 712, and optionally the error detection circuit 714. An output of the counter circuit 710 is coupled to an input of the comparator 712. The detection circuit 706 also includes an extractor 730, which is coupled to an input of the counter circuit 710. For example implementations of the detection circuit 706 that are capable of detecting the first alert condition, the detection circuit 706 can also include a comparator 732. An input of the comparator 732 is coupled to the counter circuit 710.

During operation, the detection circuit 706 performs the array counter update procedure. As part of this procedure, the detection circuit 706 reads and updates the usage-based-disturbance data 214 associated with an activated row 302 within a bank 410. For example, the extractor 730 extracts the activation count 308 from the usage-based-disturbance data 214 and provides the activation count 308 to the counter circuit 710. The counter circuit 710 increments the activation count 308 to generate an updated count 734. The detection circuit 706 writes the updated count 734 back to the usage-based-disturbance data 214 that is associated with the activated row 302. The counter circuit 710 also passes the updated count 734 to the comparator 712 and/or to the comparator 732.

In this example, the condition detected by the detection circuit 706 involves the activation count 308 meeting or exceeding a predetermined threshold. To monitor for the condition, the comparator 712 compares the updated count 734 to at least one mitigation threshold 736. If the updated count 734 is less than the mitigation threshold 736, the comparator 712 generates the condition flag 724 to indicate that the condition is not present. In this case, the management circuit 708 does not take any further action. However, if the updated count 734 is greater than or equal to the mitigation threshold 736, the comparator 712 generates the condition flag 724 to indicate that the condition is present. This causes the management circuit 708 to create a new entry 718 in the queue 716, as described above with respect to FIG. 7-1.

If the detection circuit 706 includes the error detection circuit 714, the error detection circuit 714 can test for faulty usage-based-disturbance data 214 by performing one or more tests. The error detection circuit 714 generates an error flag, which can indicate whether or not an error is detected. In some implementations, the error flag 738 can be used to enable or disable the extractor 730. For example, if the error flag 738 indicates that an error is detected, the error flag 738 can cause the extractor 730 to be disabled, thereby preventing the detection circuit 706 from performing the array counter update procedure on faulty usage-based-disturbance data 214. Although not explicitly shown, some implementations of the detection circuit 706 can write a default value to the usage-based-disturbance data 214 stored within the bank 410 if an error is detected.

To monitor for the first alert condition, the comparator 732 compares the updated count 734 to an alert threshold 740. The alert threshold 740 is set to a value that is greater than the mitigation threshold 736 and is less than the intrinsic specified limit. If the updated count 734 is less than the alert threshold 740, the comparator 732 generates an alert flag 742 to indicate that the first alert condition is not present. Alternatively, if the updated count 734 is greater than the alert threshold 740, the comparator 732 generates the alert flag 742 to indicate that the first alert condition is present. The detection circuit 706 can generate the event signal 612 based on the condition flag 724, the error flag 738, and/or based on the alert flag 742.

In another example implementation not shown, the management circuit 708 can include the comparator 732. In this case, the management circuit 708 uses the comparator 732 to compare the updated count 734 that is stored within an entry 718 of the queue 716 to the alert threshold 740. The various events detected by the usage-based-disturbance circuit 120 can be associated with different event categories, which are further described with respect to FIGS. 8 and 9-1.

Figure 8:
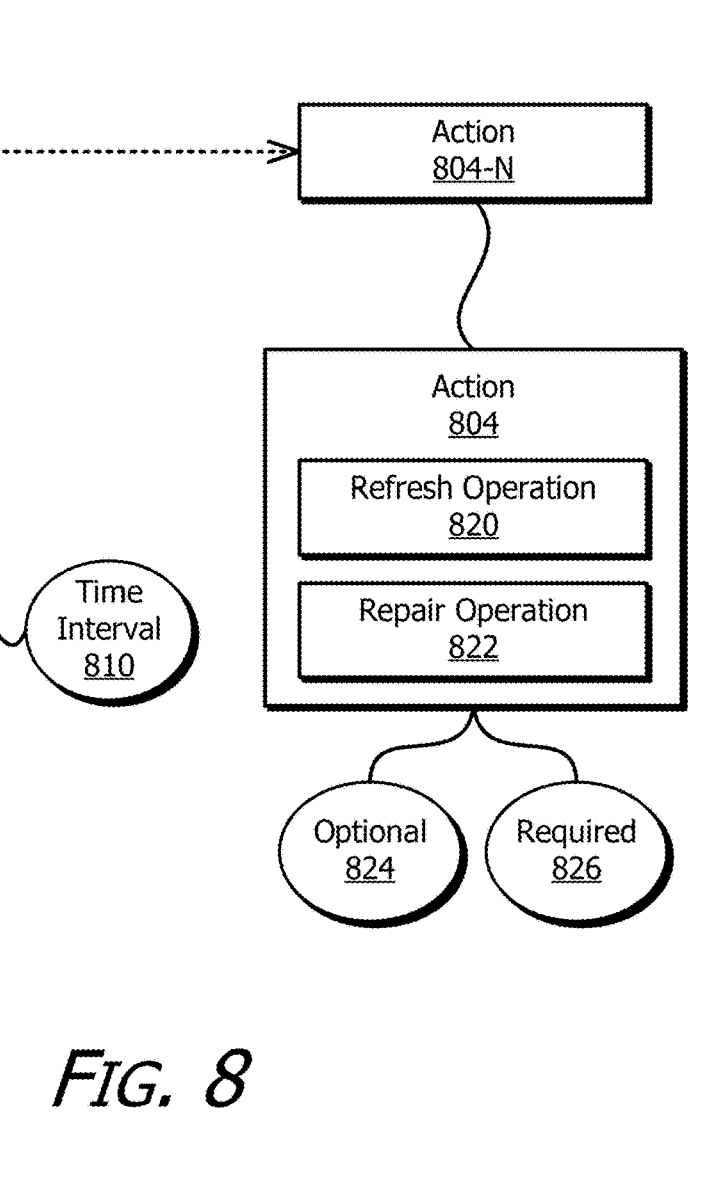
FIG. 8 illustrates an example relationship between multiple event categories and possible actions performed by a memory controller.

FIG. 8 illustrates an example relationship between various event categories 802 and actions 804 that a memory controller 114 may be empowered to perform. In this example, the usage-based-disturbance circuit 120 can detect a variety of different events. Each event is associated with one of the event categories 802-1, 802-2 . . . 802-N, where N represents a positive integer. Each event category 802 can be used to categorize one or more different events. In some cases, the different event categories 802 provide the memory controller 114 feedback regarding how well the memory device 108 is mitigating usage-based disturbance with the currently available resources (e.g., with the current scheduling of refresh commands).

The event categories 802 can be associated with different risk levels 806 and/or different priority levels 808. The risk level 806 represents a degree to which the memory device 108 may fail to mitigate usage-based disturbance. For example, the risk level 806 can indicate how likely the usage-based-disturbance effect will manifest a data error or how likely a row 302's activation count 308 may reach the intrinsic specified limit based on an occurrence of an event associated with the event category 802. Generally speaking, the risk level 806 corresponds to a probability of a "worst-case" situation occurring.

As the memory device 108 reports one or more events of an event category 802 that has a higher risk level 806, this can indicate to the memory controller 114 that the memory device 108 requires additional resources to mitigate usage-based disturbance. Alternatively, if the memory device 108 indicates that these events are not occurring, the memory controller 114 can have increased confidence that the memory device 108 is effectively mitigating usage-based disturbance with the currently available resources. In some situations, the memory controller 114 can reduce the available resources for mitigating usage-based disturbance based on the absence of these events. In this way, the memory controller 114 can conserve power and dedicate more temporal resources to normal operations for at least a period of time.

The priority level 808 indicates how important it is for the memory device 108 to address an event associated with the event category 802. The priority level 808 generally corresponds to the risk level 806. Event categories 802 with a higher risk level 806 can also have a higher priority level 808. Similarly, event categories 802 with a lower risk level 806 can have a lower priority level 808. Some priority levels 808 may be associated with a particular time interval 810. The time interval 810 can indicate a time frame in which the memory controller 114 is to perform the corresponding action 804. Higher priority levels 808 can have a shorter time interval 810 while lower priority levels 808 can have a longer time interval 810.

Some event categories 802 cause the event reporting circuit 122 to generate a notification 812, which notifies the memory controller 114 of the occurrence of the event. The notification 812 does not interrupt normal operations of the memory controller 114 (e.g., does not interrupt normal traffic). With the notification 812, the memory device 108 enables the memory controller 114 to perform a corresponding action 804 without requiring the memory controller 114 to perform the corresponding action 804. In this sense, the notification 812 indicates to the memory controller 114 that there is an opportunity for the memory device 108 to utilize additional resources for mitigation usage-based disturbance. However, it is not mandatory that the memory controller 114 provide these additional resources. As the memory controller 114 does not need to take immediate action based on the notification 812, the memory controller 114 can perform higher-priority operations and can optionally perform the corresponding action 804 at a later time.

Other event categories 802 cause the event reporting circuit 122 to generate an alert 814, which alerts the memory controller 114 of the occurrence of the event. Some alerts 814 can interrupt the normal operation of the memory controller 114 (e.g., can interrupt normal traffic). The interrupt can cause the memory controller 114 to halt normal traffic, as further described with respect to FIG. 10. Whether an event category 802 is associated with the notification 812 or the alert 814 can be based on the risk level 806 and/or the priority level 808. Event categories 802 with a lower risk level 806 and/or a lower priority level 808 can be associated with the notification 812. In contrast, event categories 802 with a higher risk level 806 and/or a higher priority level 808 can be associated with the alert 814.

Some event categories 802 can have notifications 812 and/or alerts 814 that mask 816 (e.g., block) the reporting of subsequent events associated with the corresponding event category 802 for at least a period of time. This can be beneficial for implementations in which different events are communicated using a same component of the interface 602 as the mask 816 enables events associated with other event categories 802 to be reported. Still other event categories 802 can have notifications 812 and/or alerts 814 that are persistent 818. In this case, the event reporting circuit 122 continues reporting an event until the condition that triggered the event is addressed or mitigated. For these types of reports, the termination of the report can indicate to the memory controller 114 that the event associated with the report has been addressed. In many cases, this can indicate to the memory controller 114 that normal operations can be resumed.

The reporting of multiple events associated with different event categories 802 can lead to the memory controller 114 performing different actions 804. The actions 804 represent different responses or reactions of the memory controller 114 to the reported event. In general, the different event categories 802-1, 802-2, and 802-N are associated with different actions 804-1, 804-2, and 804-N, respectively. Example actions 804 can include initiating a refresh operation 820 or initiating a repair operation 822.

The refresh operation 820 can involve the memory controller 114 sending one or more refresh commands to the memory device 108. Example refresh commands can include a refresh management (RFM) command, a self-refresh command, an auto-refresh command, a normal refresh command, and/or can by any other command relating to refreshing at least one row 302 in a bank 410. The timing for performing a refresh is indicated (or controlled) by a refresh pump, which is generated by the memory device 108 based on the refresh command. The refresh pump can alternatively be referred to as a refresh pulse. The term "refresh" can also be referred to as a row refresh or a refresh operation. Generally speaking, the quantity of refresh pumps available for each refresh command can vary depending on a duration of a time interval associated with the refresh command and/or a refresh mode of the memory device 108.

Depending on the type of refresh command, some of the refresh pumps associated with the refresh command can be dedicated to normal refresh operations and thus are unavailable for mitigating usage-based disturbance. Additionally or alternatively, some or all of the refresh pumps can be available for mitigating usage-based disturbance. It is also possible that some of the refresh pumps associated with the refresh command are previously-postponed refresh pumps. For the techniques described herein, the refresh command is considered to have at least one refresh pump that is available for mitigating usage-based disturbance.

The repair operation 822 enables the memory device 108 to repair one or more memory elements (e.g., one or more rows or columns) within the memory array 204. One type of repair operation 822 involves a hard post-package repair (hPPR) procedure. For the hard post-package repair procedure, the memory controller 114 can request that the memory device 108 permanently repair a whole combination row, including the faulty data used for usage-based disturbance mitigation. With this repair procedure, however, the viability of existing data stored in the memory row is uncertain. Further, the permanent, nonvolatile nature of the hard post-package repair can entail blowing a fuse. The procedure is relatively lengthy and can often be performed only during power up and initialization, or with a full memory reset, instead of in real-time while the memory device 108 is functional and performing memory operations for the host device 104.

Another type of repair operation 822 involves a soft post-package repair (sPPR), which is a temporary repair procedure that is significantly faster than the hard post-package repair. Further, although a soft post-package repair procedure produces a volatile repair, the soft post-package repair procedure can be performed in real-time responsive to detection of a failure. If a memory row is being repaired, the computing system may be responsible, however, for handling the data transfer (e.g., a full page of data) from the memory row corresponding to the faulty data to a spare counter and memory row combination. This data transfer can consume an appreciable amount of time while occupying the data bus.

Some actions 804 can be optional 824, while other actions 804 can be required 826 in order to effectively mitigate usage-based disturbance and avoid a worst-case situation. The actions 804 that are required 826 may need to be performed within the time interval 810 associated with the event category 802. In general, an event category 802 associated with the notification 812 is related to an action 804 that is optional 824. In contrast, an event category 802 associated with the alert 814 is related to an action 804 that is required 826. Example event categories 802 and actions 804 are further described with respect to FIGS. 9-1 and 9-2.

Figures 1, 9:
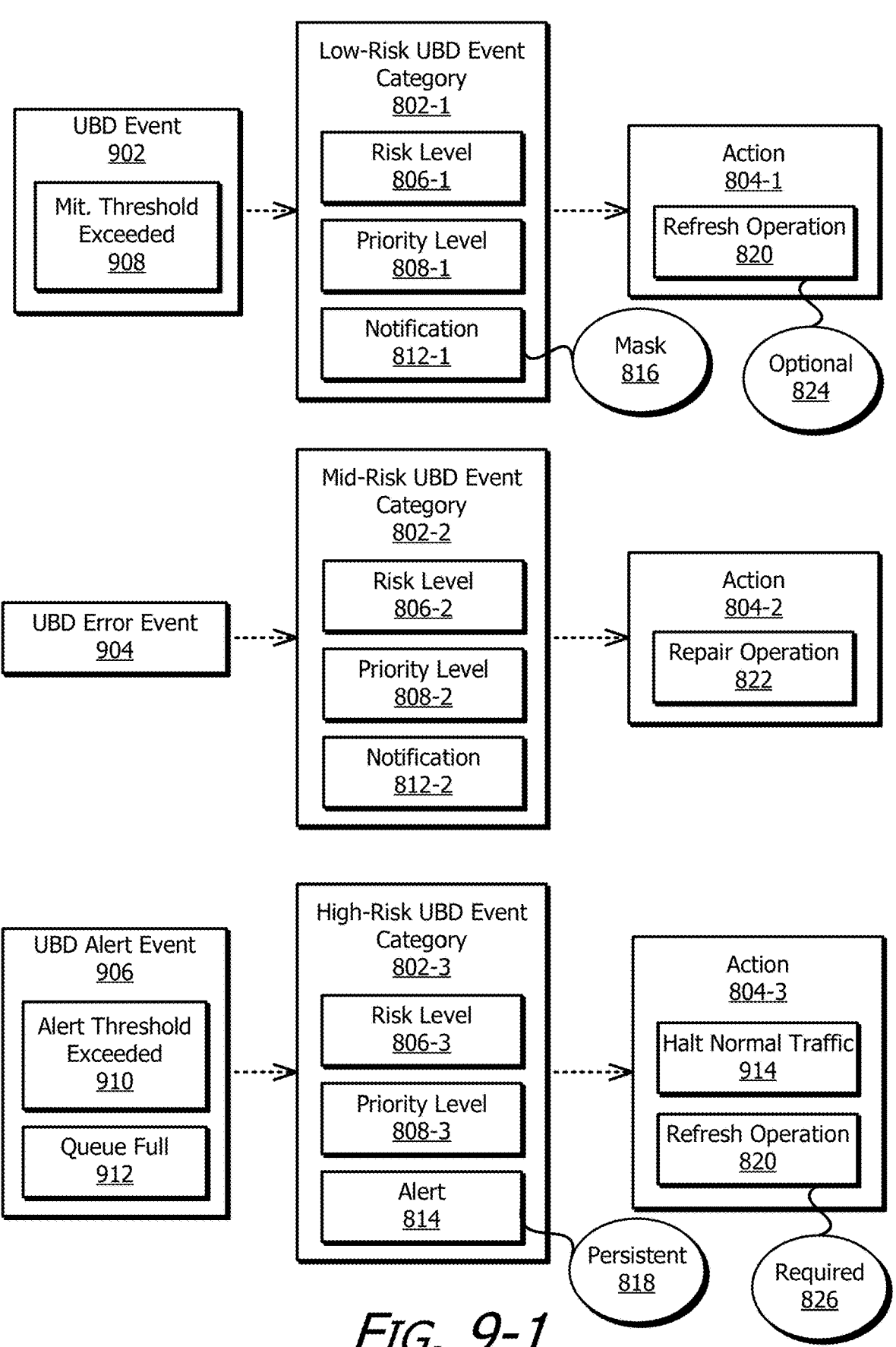
Figures 2, 9:
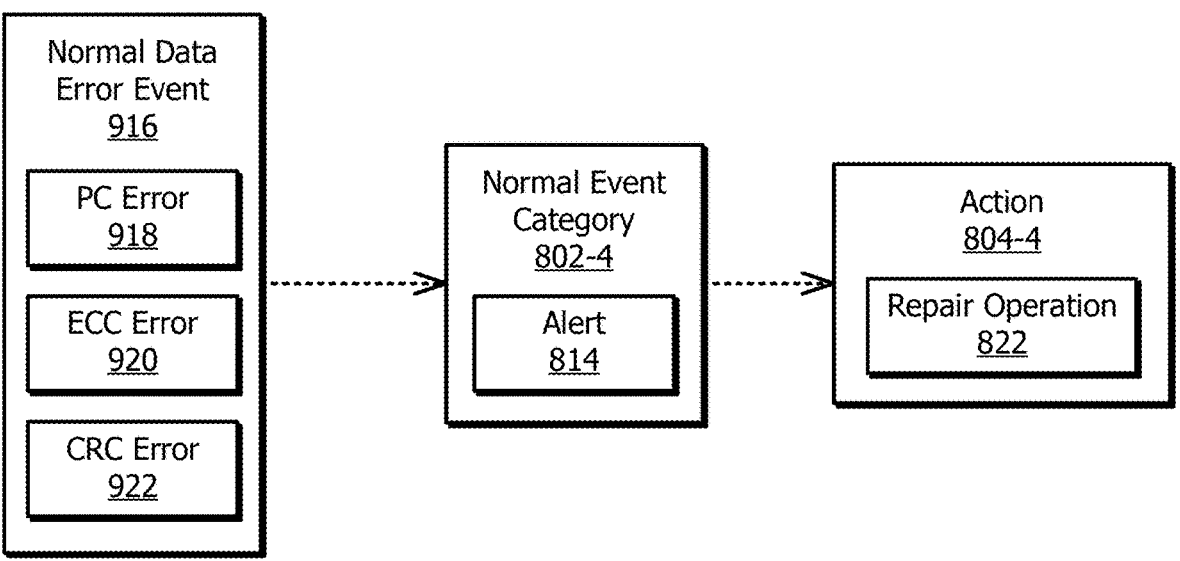

FIG. 9-1 illustrates example events, event categories 802, and actions 804 for reporting multiple events associated with mitigating usage-based disturbance. Three example event categories 802 are shown in FIG. 9-1. A first event category, which is referred to as a low-risk usage-based-disturbance event category 802-1 (low-risk UBD event category 802-1), is associated with a first risk level 806-1, a first priority level 808-1, and a first notification 812 that applies a mask 816. A second event category, which is referred to as a mid-risk usage-based-disturbance event category 802-2 (mid-risk UBD event category 802-2), is associated with a second risk level 806-2, a second priority level 808-2, and a second notification 812-2. The second risk level 806-2 of the mid-risk usage-based-disturbance event category 802-2 is higher than the first risk level 806-1 of the low-risk usage-based-disturbance event category 802-1. The priority level 808-2 of the mid-risk usage-based-disturbance event category 802-2 is also higher than the second priority level 808-1 of the low-risk usage-based-disturbance event category 802-1.

The event reporting circuit 122 reports events associated with the event categories 802-1 and 802-2 by sending notifications 812-1 and 812-2 to the memory controller 114. The notification 812-1 causes the event reporting circuit 122 to mask 816 the reporting of subsequent events associated with the low-risk usage-based-disturbance event category 802-1 for a predetermined period of time after the sending of the notification 812-1. The masking is further described with respect to FIG. 11. In contrast, the notification 812-2 does not mask the reporting of future events associated with the mid-risk usage-based-disturbance event category 802-2.

The high-risk usage-based-disturbance event category 802-3 (high-risk UBD event category 802-3) is associated with a third risk level 806-3, a third priority level 808-3, and the alert 814. The third risk level 806-3 is higher than the first and second risk levels 806-1 and 806-2. Likewise, the third priority level 808-3 is higher than the first and second priority levels 808-1 and 808-2. The event reporting circuit 122 reports events associated with the event category 802-3 by sending an alert 814, which is made persistent 818.

A variety of different events and actions 804 can be associated with the various event categories 802-1, 802-2, and 802-3. Other event categories 802 can also be defined with different characteristics (e.g., with different risk levels 806, priority levels 808, different notifications 812, and/or different alerts 814) than those described in FIG. 9-1. In the example shown in FIG. 9-1, the usage-based-disturbance circuit 120 can detect a usage-based-disturbance event 902 (UBD event 902), a usage-based-disturbance error event 904 (UBD error event 904), and a usage-based-disturbance alert event 906 (UBD alert event 906).

The usage-based-disturbance event 902 indicates an occurrence of a usage-based-disturbance condition. For example, the usage-based-disturbance condition can involve the comparator 712 indicating, via the condition flag 724, that the mitigation threshold 736 is exceeded by the activation count 308 (or the updated count 734) of an activated row 302, as indicated at 908. The event reporting circuit 122 categorizes or associates the usage-based-disturbance event 902 with the low-risk usage-based-disturbance event category 802-1.

The usage-based-disturbance error event 904 indicates an occurrence of a usage-based-disturbance error condition. For example, the usage-based-disturbance error condition can involve the error detection circuit 714 indicating, via the error flag 738, that an error is detected within the usage-based-disturbance data 214. The event reporting circuit 122 categorizes or associates the usage-based-disturbance error event 904 with the mid-risk usage-based-disturbance event category 802-2.

The usage-based-disturbance alert event 906 indicates an occurrence of an alert condition. For example, the alert condition can involve the monitor circuit 702 determining that the alert threshold 740 is exceeded by the activation count 308 (or the updated count 734) of the activated row 302, as indicated at 910. In another example, the alert condition can involve the management circuit 708 determining that the queue 716 is full, as indicated at 912. The event reporting circuit 122 categorizes or associates the usage-based-disturbance alert event 906 with the high-risk usage-based-disturbance event category 802-3.

By reporting events associated with the different event categories 802-1, 802-2, and 802-3, the memory device 108 can empower the memory controller 114 to perform a particular action 804 that is associated with the event category 802. For example, the reporting of events associated with the event categories 802-1, 802-2, and 802-3 can respectively enable or cause the memory controller 114 to perform the actions 804-1, 804-2, and 804-3.

The first action 804-1 involves a refresh operation 820, which is optional 824 due to the lower risk level 806-1 and the lower priority level 808-1 of the low-risk usage-based-disturbance event category 802-1. As the first action 804-1 is optional, the memory controller 114 may not perform the refresh operation 820 associated with the first action 804-1. If resources are constrained (e.g., the apparatus 102 is operating in a low-power mode or the memory controller 114 has higher-priority operations), the memory controller 114 may not perform the refresh operation 820. If resources are not constrained, the memory controller 114 may perform the refresh operation 820. In this case, the memory controller 114 can follow a defined protocol to issue additional refresh commands to assist the memory device 108 in mitigating usage-based disturbance.

The second action 804-2 involves a repair operation 822. In various implementations, the second action 804-2 may be optional 824 or required 826. In some implementations, the second action 804-2 may be required 826 but the memory controller 114 is given an adequate amount of time to start the second action 804-2. In this way, the memory controller 114 does not have to interrupt current operations to perform the action 804 and can wait for a suitable time. The actions 804-1 and 804-2 can be performed as part of normal operations without causing traffic to halt.

The third action 804-3 involves halting normal traffic 914 and performing a refresh operation 820, which is required 826. In some implementations, the third action 804-3 may need to be initiated in a shorter amount of time compared to the second action 804-2. In addition to reporting events associated with usage-based-disturbance mitigation, the event reporting circuit 122 can also report events associated with normal operations (e.g., operations that do not involve mitigating usage-based disturbance), as further described with respect to FIG. 9-2.

FIG. 9-2 illustrates another example event, event category, and action associated with a normal operation (e.g., a non-usage-based-disturbance-mitigation operation). A fourth event category, which is referred to as a normal event category 802-4, is associated with an alert 814. The alert 814 may not cause subsequent events associated with the normal event category 802-4 to be masked. This design choice can be made for situations in which the normal data error events 916 have a relatively low probability of occurrence at least compared to the probability of one or more of the usage-based-disturbance mitigation events (e.g., one or more of the events 902, 904, and/or 906 in FIG. 9-1).

The error detection circuit 610 can detect events that are associated with the normal event category 804-2. Example events include a normal data error event 916, such as the detection of a parity-check error 918 (PC error 918), an error-correcting-code error 920 (ECC error 920), and/or a cyclic-redundancy-check error (CRC error 922). The reporting of the normal data error event 916 associated with the normal event category 802-4 can empower the memory controller 114 to perform a fourth action 804-4. The fourth action 804-4 can include initiating a repair operation 822 that repairs the faulty normal data 306 associated with the normal data error event 916. The occurrence of different events can be communicated to the memory controller 114 using the report signal 614, as further described with respect to FIG. 10.

Figure 10:
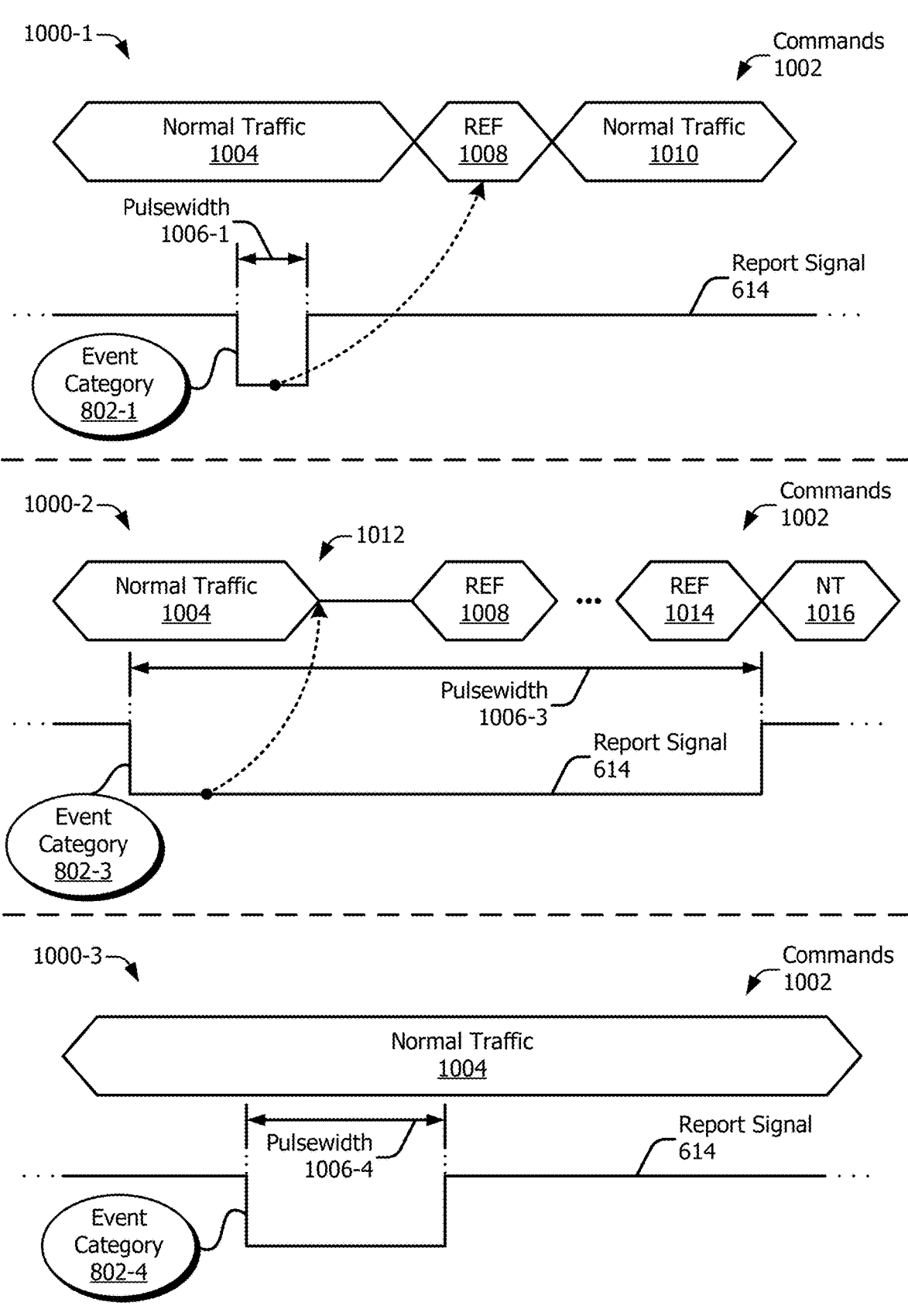
FIG. 10 illustrates example report signals for reporting multiple events associated with mitigating usage-based disturbance.

FIG. 10 illustrates example report signals 614 for reporting multiple events associated with mitigating usage-based disturbance. In this example, the event reporting circuit 122 provides the report signal 614 to the alert pin 604 of the interface 602. To indicate the occurrence of events associated with different event categories 802, the event reporting circuit 122 modifies or changes a characteristic (e.g., a waveform characteristic) of the report signal 614. For example, the event reporting circuit 122 can modify an amplitude of the report signal 614, a frequency of the report signal 614, and/or a pulsewidth of the report signal 614. In the examples shown in FIG. 10, the pulsewidth of the report signal 614 is adjusted to indicate the occurrence of events associated with different event categories 802, as further described below.

At 1000-1, the memory controller 114 sends commands 1002, which include normal traffic at 1004. The normal traffic can include normal write and/or read commands. The normal traffic is associated with normal operations of the memory controller 114 and does not necessarily involve mitigating usage-based disturbance. At some point during the normal traffic 1004, an event associated with the event category 802-1 occurs and is reported by the event reporting circuit 122. The event reporting circuit 122 reports the event by causing the report signal 614 to have a pulse with a first pulsewidth 1006-1. The first pulsewidth 1006-1 is associated with the event category 802-1. This means that the memory controller 114 can determine that an event associated with the first event category 802-1 occurred based on the report signal 614 having a pulse with the pulsewidth 1006-1.

For explanation purposes, consider that the event category 802-1 is the low-risk usage-based-disturbance event category 802-1 described in FIG. 9-1. In this case, the reporting of the event provides a notification 812-1 to the memory controller 114. This notification 812-1 enables the memory controller 114 to perform the action 804-1 associated with the event category 802-1. Based on the event category 802-1, the action 804-1 is optional 824 and the memory controller 114 may or may not perform the action 804-1. In this example, the memory controller 114 performs the action 804-1 by sending a refresh command at 1008 (REFM 1008). The normal traffic can resume at 1010. As shown at 1000-1, the reporting of the event does not cause the memory controller 114 to halt the normal traffic 1004. Instead, the memory controller 114 can choose to perform the refresh operation at some point in time that is suitable and/or convenient.

At 1000-2, the memory controller 114 sends commands 1002, which include normal traffic at 1004. At some point during the normal traffic 1004, an event associated with the event category 802-3 occurs and is reported by the event reporting circuit 122. For explanation purposes, consider that the event category 802-3 is the high-risk usage-based-disturbance event category 802-3 described in FIG. 9-1. The event reporting circuit 122 reports the event by causing the report signal 614 to have a persistent pulse, which can be referred to as a third pulse with a third pulsewidth 106-3. The third pulsewidth 1006-3 is associated with the event category 802-3. This means that the memory controller 114 can determine that an event associated with the third event category 802-3 occurred based on the report signal 614 having a pulse with the pulsewidth 1006-3. In this case, the pulse of the report signal 614 is persistent 818 until the condition that triggered the event is addressed. This means that the pulsewidth 1006-3 is made larger than the pulsewidths 1006 associated with other event categories 802.

The reporting of the event at 1000-2 causes the memory controller 114 to halt the normal traffic with a certain amount of time, as indicated at 1012. It also causes the memory controller 114 to schedule multiple refresh commands, as indicated at 1008 and 1014. The refresh commands enable the memory device 108 to address the condition that triggered the event associated with the event category 802-3. Upon addressing the condition, the event reporting circuit 122 terminates the reporting of the event (e.g., terminates the pulse within the report signal 614). This enables the memory controller 114 to resume normal operations. As such, the normal traffic (NT) is shown to resume at 1016.

At 1000-3, the memory controller 114 sends commands 1002, which include normal traffic at 1004. At some point during the normal traffic 1004, an event associated with the event category 802-4 occurs and is reported by the event reporting circuit 122. The event reporting circuit 122 reports the event by causing the report signal 614 to have a pulse with a fourth pulsewidth 1006-4. The fourth pulsewidth 1006-4 is associated with the event category 802-4 and is different from the other pulsewidths 1006-1 and 1006-3.

In FIG. 10, the pulsewidth 1006-1 is depicted as a short-length pulsewidth and the pulsewidth 1006-4 is depicted as a mid-length pulsewidth. The pulsewidths 1006 shown in FIG. 10 for the different event categories 802 are example pulsewidths provided for explanation purposes. Various implementations can utilize other pulsewidth lengths. For example, a different implementation can represent the pulsewidth 1006-1 using a mid-length pulsewidth and can represent the pulsewidth 1006-4 using a short-length pulsewidth. The durations of the pulsewidths 1006 are a design choice. For reporting multiple events using a same component (e.g., the alert pin 604), the pulsewidths 1006 can have any duration so long as they are different and can be distinguished by the memory controller 114.

Although not explicitly shown in FIG. 10, the event reporting circuit 122 can report events associated with other event categories 802 by generating the report signal 614 to have another pulse with a different pulsewidth compared to the pulsewidths 1006-1, 1006-3, and 1006-4. For example, the event reporting circuit 122 can report an event associated with the second event category 802-2 by generating the report signal 614 to have a second pulse with a second pulsewidth that is different from the pulsewidths 1006-1, 1006-3, and 1006-4.

The example report signals 614 shown in FIG. 10 enable the event reporting circuit 122 to report multiple events to the memory controller 114 using the alert pin 604. In other example implementations, the event reporting circuit 122 can report the multiple events to the memory controller 114 using the mode register 606 and/or the communication bus 608. In this case, the event reporting circuit 122 can change the data (e.g., the information) that is carried by the report signal 614 to indicate the occurrence of multiple events associated with different event categories 802. An example operation of the event reporting circuit 122 is further described with respect to FIG. 11.

Figure 11:
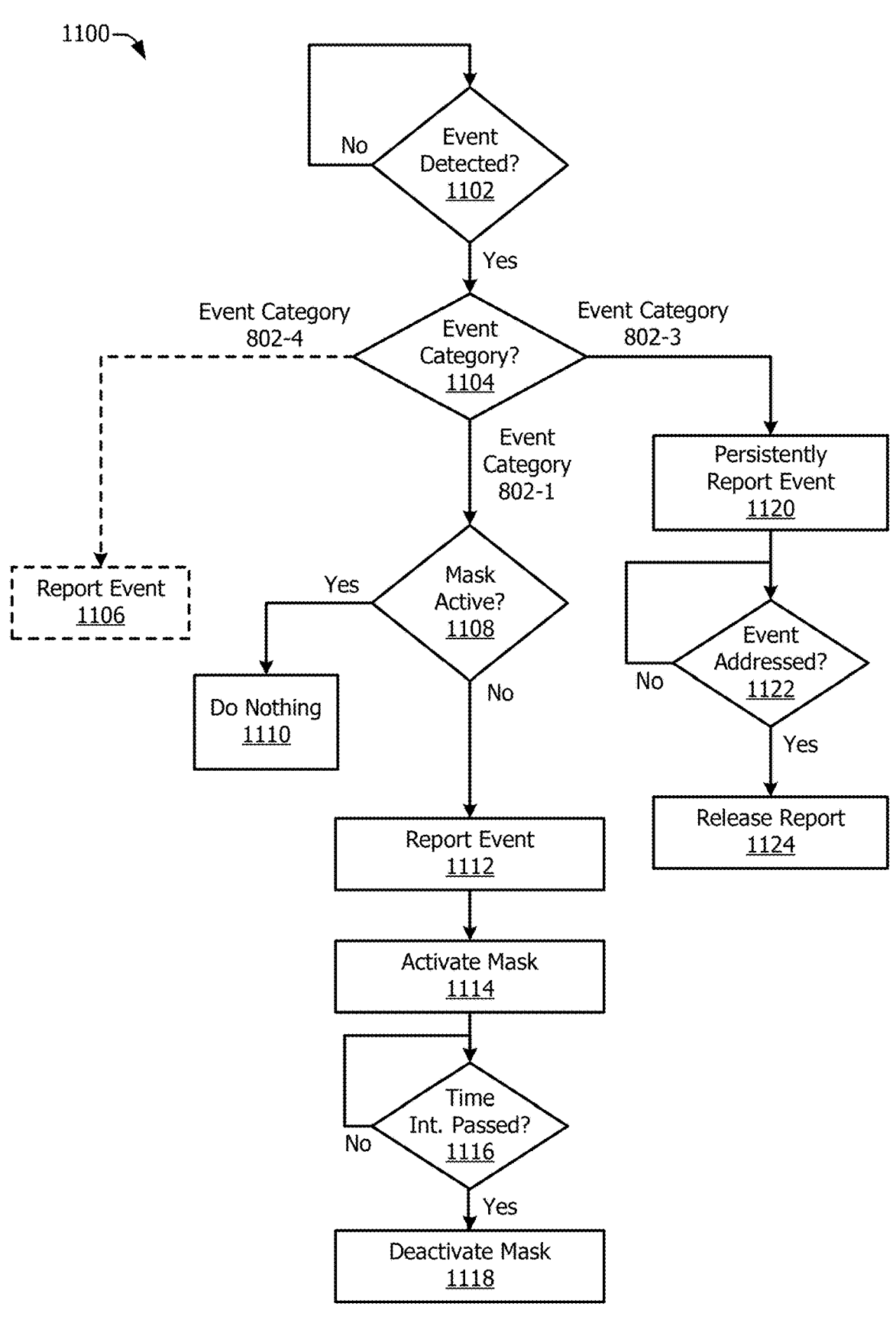
FIG. 11 illustrates an example scheme performed by an event reporting circuit for reporting multiple events associated with mitigating usage-based disturbance.

FIG. 11 illustrates an example scheme 1100 implemented by the event reporting circuit 122 for reporting multiple events associated with mitigating usage-based disturbance. In this example, the event reporting circuit 122 supports reporting events associated with event categories 802-1 and 802-3, which can correspond to the low-risk usage-based-disturbance event category 802-1 of FIG. 9-1 and the high-risk usage-based-disturbance event category 802-3 of FIG. 9-1, respectively. In some implementations, the event reporting circuit 122 also supports reporting events associated with normal operations (e.g., operations that do not involve mitigating usage-based disturbance). This means that the event reporting circuit 122 can report events associated with the event category 802-4, which can correspond to the normal event category 802-4 of FIG. 9-2. Although not explicitly shown in FIG. 11, other implementations of the event reporting circuit 122 can support other event categories 802, such as the mid-risk usage-based-disturbance event category 802-2 of FIG. 9-1.

At 1102, the event reporting circuit 122 determines if an event is detected. For example, the event reporting circuit 122 analyzes the event signals 612-1 to 612-B to determine if an event is detected by the usage-based-disturbance circuits 120-1 to 120-B. Optionally, the event reporting circuit 122 can also analyze the event signal 616 to determine if an event is detected by the error detection circuit 610.

At 1104, the event reporting circuit 122 categorizes the detected event by determining which event category 802 is associated with the detected event. If the event corresponds to the event category 802-4, the event reporting circuit 122 reports the event at 1106. For example, the event reporting circuit 122 can report the event by generating the report signal 614 with a pulse having a pulsewidth 1006-4 that corresponds with the event category 802-4, as shown at 1000-3 in FIG. 10.

If the event corresponds to the event category 802-1, the event reporting circuit 122 determines if a mask is active at 1108. A mask can be active if the event reporting circuit 122 reported a previous event associated with the event category 802-1 and activated the mask 816. When the mask 816 is active, the event reporting circuit 122 does not report additional events associated with the event category 802-1. As such, the event reporting circuit 122 does nothing at 1110. If the mask 816 is not active at 1108, the process continues to 1112.

At 1112, the event reporting circuit 122 reports the event. For example, the event reporting circuit 122 can report the event by generating the report signal 614 with a pulse having a pulsewidth 1006-1 that corresponds with the event category 802-1, as shown at 1000-1 in FIG. 10. The event reporting circuit 122 also activates the mask at 1114 to prevent other events associated with the event category 802-1 from being reported for a predetermined time interval. While the mask 816 is active, the event reporting circuit 122 skips or omits the reporting of events associated with the event category 802-1. The mask 816 does not impact the reporting of events associated with other event categories 802, such as the event categories 802-3 or 802-4.

At 1116, the event reporting circuit 122 monitors whether the time interval has passed at 1116. If the amount of time between the occurrences of two events associated with the event category 802-1 exceeds the predetermined time interval (e.g., exceeds a threshold), the event reporting circuit 122 deactivates the mask at 1118. This allows the next event associated with the event category 802-1 to be reported. If the predetermined time interval has not passed since the reporting of the event 1112, the mask 816 remains active and prevents the event reporting circuit 122 from reporting additional events associated with the event category 802-1.

Returning to 1104, if the detected event is associated with the event category 802-3, the process continues to 1120. At 1120, the event reporting circuit 122 persistently reports the event associated with the event category 802-3. This can involve generating the report signal 614 with a persistent pulse, as shown at 1000-2 in FIG. 10. At 1122, the event reporting circuit 122 monitors if the event (e.g., the condition that triggered the event) has been addressed. In the case of the event 910, this can include determining that victim rows corresponding to the row 302 with the activation count 308 that exceeded the alert threshold have been refreshed. In the case of the event 912, this can include determining that the queue 716 has some empty space for new entries 718. Once the event has been addressed, the event reporting circuit 122 releases the report at 1124. In other words, the event reporting circuit 122 stops reporting the event (e.g., terminates the pulse of the report signal 614). By releasing the report, the memory device 108 is effectively reporting to the memory controller 114 that the condition that triggered the event has been addressed. This enables the memory controller 114 to resume normal operations, as shown at 1016 in FIG. 10.

EXAMPLE METHODS

This section describes example methods for implementing aspects of reporting multiple events associated with mitigating usage-based disturbance with reference to the flow diagrams of FIGS. 12 to 14. These descriptions may also refer to components, entities, and other aspects depicted in FIGS. 1 to 11 by way of example only. The described methods are not necessarily limited to performance by one entity or multiple entities operating on one device.

FIG. 12 illustrates a method 1200, which includes operations 1202 through 1208. In aspects, operations of the method 1200 are implemented by a memory device 108 as described with reference to FIG. 1. In particular, the operations of the method 1200 are performed, at least in part, by the event reporting circuit 122 of FIG. 1.

At 1202, an occurrence of a first event associated with mitigating usage-based disturbance is detected during a first time interval. The first event is associated with a first event category. For example, the usage-based-disturbance circuit 120 detects an occurrence of a first event associated with mitigating usage-based disturbance. The first event is associated with a first event category 802. In an example situation, the first event represents the usage-based-disturbance event 902, and the first event category 802 represents the low-risk usage-based-disturbance event category 802-1 of FIG. 9-1. The usage-based-disturbance circuit 120 generates the event signal 612 to indicate the occurrence of the event.

At 1204, the occurrence of the first event is reported to the memory controller to enable the memory controller to perform a first action to address the first event. For example, the event reporting circuit 122 reports the first event to the memory controller 114 using the interface 602. This report enables the memory controller 114 to perform a first action 804-1 associated with the first event category 802-1. In many cases, the first action 804-1 enables the memory device 108 to address the condition that triggered the event. In this case, the memory controller 114 has the option to perform the first action 804-1 or to skip performing the first action 804-1.

At 1206, an occurrence of a second event associated with mitigating usage-based disturbance is detected during a second time interval. The second event is associated with a second event category that differs from the first event category. For example, the usage-based-disturbance circuit 120 detects an occurrence of a second event associated with mitigating usage-based disturbance. The second event is associated with a second event category that differs from the first event category 802-1. In an example situation, the second event represents the usage-based-disturbance alert event 906, and the second event category represents the high-risk usage-based-disturbance event category 802-3. The usage-based-disturbance circuit 120 generates the event signal 612 to indicate the occurrence of the event.

At 1208, the occurrence of the second event is reported to the memory controller to cause the memory controller to perform a second action associated with the second event category. For example, the event reporting circuit 122 reports the second event to the memory controller 114 using the interface 602. This report causes the memory controller

114 to perform a second action associated with the second event category (e.g., the action 804-3 associated with the event category 802-3). In many cases, the second action enables the memory device 108 to address the condition that triggered the event. In this case, the memory controller 114 is required to perform the second action associated with the second event category.

FIG. 13 illustrates a method 1300, which includes operations 1302 through 1310. In aspects, operations of the method 1300 are implemented by a memory device 108 as described with reference to FIG. 1. In particular, the operations of the method 1300 are performed, at least in part, by the event reporting circuit 122 of FIG. 1.

At 1302, an occurrence of a first event associated with mitigating usage-based disturbance is detected during a first time interval. The first event is associated with a first event category. For example, the usage-based-disturbance circuit 120 detects an occurrence of a first event associated with mitigating usage-based disturbance. The first event is associated with a first event category 802. In an example situation, the first event represents the usage-based-disturbance event 902, and the first event category 802 represents the low-risk usage-based-disturbance event category 802-1 of FIG. 9-1.

At 1304, an occurrence of a second event associated with mitigating usage-based disturbance is detected during a second time interval. The second event is associated with a second event category that differs from the first event category. For example, the usage-based-disturbance circuit 120 detects an occurrence of a second event associated with mitigating usage-based disturbance. The second event is associated with a second event category that differs from the first event category. In an example situation, the second event represents the usage-based-disturbance alert event 906, and the second event category represents the high-risk usage-based-disturbance event category 802-3.

At 1306, an event signal that selectively indicates the occurrence of the first event and the occurrence of the second event is generated. For example, the usage-based-disturbance circuit 120 generates the event signal 612 to selectively indicate the occurrence of the first event and the occurrence of the second event.

At 1308, a report signal is generated based on the event signal. The report signal has a characteristic that changes to selectively indicate the occurrence of the first event and the occurrence of the second event. For example, the event reporting circuit 122 generates the report signal 614 based on the event signal 612, as shown in FIG. 6. The report signal 614 has a characteristic that changes to selectively indicate the occurrence of the first event and the occurrence of the second event. Consider an example in which the report signal 614 is provided to the alert pin 604. In this example, the event reporting circuit 122 changes a pulsewidth, a frequency, and/or an amplitude of the report signal 614 to selectively indicate the occurrences of the first and second events. Consider another example in which the report signal 614 is provided to the mode register 606 or the communication bus 608. In this example, the event reporting circuit 122 changes the data (e.g., the information) that is carried by the report signal 614 to selectively indicate the occurrences of the first and second events.

At 1310, the report signal is provided at an interface that is coupled to a memory controller. For example, the event reporting circuit 122 provides the report signal 614 at the interface 602, which is coupled to the memory controller 114.

FIG. 14 illustrates a method 1400, which includes operations 1402 through 1408. In aspects, operations of the method 1400 are implemented by a host device 104 as described with reference to FIG. 1. In particular, the operations of the method 1400 are performed, at least in part, by the memory controller 114 of FIG. 1.

At 1402, a first report that indicates an occurrence of a first event associated with mitigating usage-based disturbance is received from a memory device. The first event corresponds to a first event category. For example, the memory controller 114 receives a first report from the memory device 108 that indicates an occurrence of a first event associated with mitigating usage-based disturbance. The first event corresponds to a first event category. In an example situation, the first event represents the usage-based-disturbance event 902, and the first event category 802 represents the low-risk usage-based-disturbance event category 802-1 of FIG. 9-1.

At 1404, a first action is selectively performed based on the first report. The first action is associated with the first event category. For example, the memory controller 114 selectively performs the first action 804-1 based on the first report. The first action 804-1 is associated with the first event category 802-1, as shown in FIGS. 8 and 9-1. In this case, the memory controller 114 has the option to perform or to skip performing the first action 804-1.

At 1406, a second report that indicates an occurrence of a second event associated with mitigating usage-based disturbance is received from the memory device. The second event corresponds to a second event category that differs from the first event category. For example, the memory controller 114 receives the second report that indicates the occurrence of the second event associated with mitigating usage-based disturbance. The second event corresponds to the second event category. In an example situation, the second event represents the usage-based-disturbance alert event 906, and the second event category represents the high-risk usage-based-disturbance event category 802-3.

At 1408, a second action is performed based on the second report. The second action is associated with the second event category. For example, the memory controller 114 performs the second action based on the second report. The second action can be the action 804-3 associated with the event category 804-3. In this case, the memory controller 114 is required to perform the second action.

For the figures described above, the order in which operations are shown and/or described are not intended to be construed as a limitation. Any number or combination of the described process operations can be combined or rearranged in any order to implement a given method or an alternative method. Operations may also be omitted from or added to the described methods. Further, described operations can be implemented in fully or partially overlapping manners.

Aspects of the above methods may be implemented in, for example, hardware (e.g., fixed-circuit circuitry or a processor in conjunction with a memory), firmware, software, or some combination thereof. The methods may be realized using one or more of the apparatuses or components shown in FIGS. 1 to 11, the components of which may be further divided, combined, rearranged, and so on. The devices and components of these figures generally represent hardware, such as electronic devices, packaged modules, IC chips, or circuits; firmware or the actions thereof; software; or a combination thereof. Thus, these figures illustrate some of the many possible systems or apparatuses capable of implementing the described methods.

Computer-readable media includes both non-transitory computer storage media and communication media including any medium that facilitates transfer of a computer program (e.g., an application) or data from one entity to another. Non-transitory computer storage media can be any available medium accessible by a computer, such as RAM, ROM, Flash, EEPROM, optical media, and magnetic media.

In the following, various examples for implementing aspects of reporting multiple events associated with mitigating usage-based disturbance are described:

Example 1: A method performed by a memory device that is coupled to a memory controller, the method comprising:

detecting, during a first time interval, an occurrence of a first event associated with mitigating usage-based disturbance, the first event associated with a first event category;

reporting, to the memory controller, the occurrence of the first event to enable the memory controller to perform a first action associated with the first event category;

detecting, during a second time interval, an occurrence of a second event associated with mitigating usage-based disturbance, the second event associated with a second event category that differs from the first event category; and reporting, to the memory controller, the occurrence of the second event to cause the memory controller to perform a second action associated with the second event category.

Example 2: The method of example 1 or any other example, wherein:

the first event category is associated with a first risk level;

the second event category is associated with a second risk level that is higher than the first risk level;

the reporting of the occurrence of the first event comprises notifying the memory controller of the occurrence of the first event without interrupting an operation of the memory controller; and the reporting of the occurrence of the second event comprises alerting the memory controller to the occurrence of the second event and interrupting the operation of the memory controller.

Example 3: The method of example 2 or any other example, wherein:

the detecting of the occurrence of the first event comprises determining that an activation count of a row is greater than a mitigation threshold; and the detecting of the occurrence of the second event comprises at least one of the following:

determining that the activation count of the row is greater than an alert threshold; or determining that a queue storing addresses of aggressor rows is full.

Example 4: The method of example 2 or any other example, wherein:

the first action comprises the memory controller sending a refresh command; and the second action comprises the memory controller halting the operation and sending multiple refresh commands until a condition that triggered the second event is addressed.

Example 5: The method of example 4 or any other example, further comprising:

reporting, to the memory controller, that the second event has been addressed to enable the memory controller to resume the operation.

Example 6: The method of example 1 or any other example, further comprising:

detecting, during a third time interval, an occurrence of a third event associated with mitigating usage-based disturbance, the third event associated with the first event category; and based on an amount of time having elapsed between the occurrences of the first and third events being greater than a threshold, reporting, to the memory controller, the occurrence of the third event to enable the memory controller to perform the first action; or based on the amount of time having elapsed between the occurrences of the first and third events being less than the threshold, skipping reporting of the occurrence of the third event to the memory controller.

Example 7: The method of example 1 or any other example, further comprising:

generating a report signal; and providing the report signal at an alert pin of the memory device, wherein:

the reporting of the occurrence of the first event comprises changing a characteristic of the report signal to indicate the occurrence of the first event; and the reporting of the occurrence of the second event comprises changing the characteristic of the report signal to indicate the occurrence of the second event.

Example 8: The method of example 7 or any other example, wherein the characteristic comprises at least one of the following:

a pulsewidth of the report signal;

an amplitude of the report signal; or a frequency of the report signal.

Example 9: The method of example 8 or any other example, wherein:

the characteristic comprises the pulsewidth of the report signal;

the changing of the characteristic of the report signal to indicate the occurrence of the first event comprises causing the pulsewidth of the report signal to be a first pulsewidth; and the changing of the characteristic of the report signal to indicate the occurrence of the second event comprises causing the pulsewidth of the report signal to be a second pulsewidth that is different from the first pulsewidth.

Example 10: The method of example 9 or any other example, further comprising:

detecting, during a fourth time interval, an occurrence of a fourth event associated with an error in normal data that is stored within the memory device, the fourth event associated with a fourth event category; and reporting, to the memory controller, the occurrence of the fourth event to enable the memory controller to perform a fourth action associated with the fourth event category, wherein the reporting of the occurrence of the fourth event comprises causing the pulsewidth of the report signal to be a fourth pulsewidth that is different from the first and second pulsewidths.

Example 11: The method of example 10 or any other example, wherein the fourth action comprises initiating a repair operation on the normal data.

Example 12: The method of example 1 or any other example, further comprising:

generating a report signal; and providing the report signal to an interface that couples the memory device to the memory controller, wherein the interface comprises:

an alert pin of the memory device;

a mode register of the memory device; or a communication bus.

Example 13: A memory device comprising:

a first circuit configured to:

detect, during a first time interval, an occurrence of a first event associated with mitigating usage-based disturbance, the first event associated with a first event category;

detect, during a second time interval, an occurrence of a second event associated with mitigating usage-based disturbance, the second event associated with a second event category that differs from the first event category; and generate an event signal that selectively indicates the occurrence of the first event and the occurrence of the second event; and a second circuit coupled to the first circuit, the second circuit configured to:

generate, based on the event signal, a report signal having a characteristic that changes to selectively indicate the occurrence of the first event and the occurrence of the second event; and provide the report signal at an interface that is coupled to a memory controller.

Example 14: The memory device of example 13 or any other example, wherein: the first circuit is implemented at a local-bank level of the memory device; and the second circuit is implemented at a global-bank level of the memory device.

Example 15: The memory device of example 13 or any other example, wherein:

the interface comprises an alert pin of the memory device; and the second circuit is configured to change a pulsewidth of the report signal to selectively indicate the occurrence of the first event and the occurrence of the second event.

Example 16: The memory device of example 13 or any other example, wherein:

the first circuit is configured to:

detect, during a third time interval, an occurrence of a third event associated with mitigating usage-based disturbance, the third event associated with the first event category; and generate the event signal to indicate the occurrence of the third event; and the second circuit is configured to:

block reporting of the third event based on an amount of time having elapsed between the occurrences of the first and third events being less than a threshold; or generate the report signal having the characteristic that changes to indicate the occurrence of the third event based on the amount of time having elapsed between the occurrences of the first and third events being greater than the threshold.

Example 17: The memory device of example 13 or any other example, further comprising:

a third circuit configured to:

detect, during a fourth time interval, an occurrence of a fourth event associated with an error in normal data that is stored within the memory device, the fourth event associated with a fourth event category; and generate a second event signal that indicates the occurrence of the fourth event, wherein the second circuit is coupled to the third circuit
and is configured to generate the report signal having
the characteristic that changes to indicate the occur-
rence of the fourth event.

Example 18: The memory device of example 17 or any
other example, wherein:

the third circuit is configured to detect at least one of the
following:

a parity error in the normal data;
an error-correcting-code error in the normal data; or
a cyclic redundancy check error in the normal data; and the second circuit is configured to provide the report
signal at the interface to cause the memory controller to
initiate a repair operation on the normal data associated
with the error.

Example 19: A method performed by a memory control-
ler, the method comprising:

receiving, from a memory device, a first report that
indicates an occurrence of a first event associated with
mitigating usage-based disturbance, the first event cor-
responding to a first event category;

selectively performing, based on the first report, a first
action that is associated with the first event category;

receiving, from the memory device, a second report that
indicates an occurrence of a second event associated
with mitigating usage-based disturbance, the second
event corresponding to a second event category that
differs from the first event category; and performing, based on the second report, a second action
that is associated with the second event category.

Example 20: The method of example 19 or any other
example, wherein:

the selectively performing of the first action comprises
sending a refresh command; and the performing of the second action comprises halting
normal traffic and sending multiple refresh commands
until the memory device reports that the second event
has been addressed.

Unless context dictates otherwise, use herein of the word
"or" may be considered use of an "inclusive or," or a term
that permits inclusion or application of one or more items
that are linked by the word "or" (e.g., a phrase "A or B" may
be interpreted as permitting just "A," as permitting just "B,"
or as permitting both "A" and "B"). Also, as used herein, a
phrase referring to "at least one of" a list of items refers to
any combination of those items, including single members.
For instance, "at least one of a, b, or c" can cover a, b, c, a-b,
a-c, b-c, and a-b-c, as well as any combination with mul-
tiples of the same element (e.g., a-a, a-a-a, a-a-b, a-a-c,
a-b-b, a-c-c, b-b, b-b-b, b-b-c, c-c, and c-c-c, or any other
ordering of a, b, and c). Further, items represented in the
accompanying figures and terms discussed herein may be
indicative of one or more items or terms, and thus reference
may be made interchangeably to single or plural forms of the
items and terms in this written description.

CONCLUSION

Although aspects of reporting multiple events associated
with mitigating usage-based disturbance have been
described in language specific to certain features and/or
methods, the subject of the appended claims is not neces-
sarily limited to the specific features or methods described.
Rather, the specific features and methods are disclosed as a
variety of example implementations of reporting multiple
events associated with mitigating usage-based disturbance.

What is claimed is:
1. A method performed by a memory device that is
coupled to a memory controller, the method comprising:

detecting, during a first time interval, an occurrence of a
first event associated with mitigating usage-based dis-
turbance, the first event associated with a first event
category, the first event category associated with a first
risk level;

reporting, to the memory controller, the occurrence of the
first event to enable the memory controller to perform
a first action associated with the first event category, the
reporting of the occurrence of the first event comprising
notifying the memory controller of the occurrence of
the first event without interrupting the memory con-
troller;

detecting, during a second time interval, an occurrence of
a second event associated with mitigating usage-based
disturbance, the second event associated with a second
event category that differs from the first event category,
the second event category associated with a second risk
level that is higher than the first risk level; and reporting, to the memory controller, the occurrence of the
second event to cause the memory controller to perform
a second action associated with the second event cat-
egory, the reporting of the occurrence of the second
event comprising alerting the memory controller to the
occurrence of the second event and interrupting the
memory controller.

2. The method of claim 1, wherein:
the notifying of the memory controller of the occurrence
of the first event enables normal traffic to continue to
pass between the memory controller and the memory
device; and
the alerting of the memory controller to the occurrence of
the second event comprises causing the memory con-
troller to halt the normal traffic.

3. The method of claim 1, wherein:
the detecting of the occurrence of the first event comprises
determining that an activation count of a row is greater
than a mitigation threshold; and
the detecting of the occurrence of the second event
comprises at least one of the following:
determining that the activation count of the row is
greater than an alert threshold; or
determining that a queue storing addresses of aggressor
rows is full.

4. The method of claim 2, wherein:
the normal traffic comprises at least one of a write
command or a read command;
the first action comprises the memory controller sending
a refresh command; and
the second action comprises the memory controller halt-
ing the normal traffic and sending multiple refresh
commands until a condition that triggered the second
event is addressed.

5. The method of claim 4, further comprising:
reporting, to the memory controller, that the second event
has been addressed to enable the memory controller to
resume transmission of the normal traffic.

6. The method of claim 1, further comprising:
detecting, during a third time interval, an occurrence of a
third event associated with mitigating usage-based dis-
turbance, the third event associated with the first event
category; and
based on an amount of time having elapsed between the
occurrences of the first and third events being greater
than a threshold, reporting, to the memory controller, the occurrence of the third event to enable the memory controller to perform the first action; or based on the amount of time having elapsed between the occurrences of the first and third events being less than the threshold, skipping reporting of the occurrence of the third event to the memory controller.

7. The method of claim 1, further comprising:

generating a report signal; and providing the report signal at an alert pin of the memory device, wherein:

the reporting of the occurrence of the first event comprises changing a characteristic of the report signal to indicate the occurrence of the first event; and the reporting of the occurrence of the second event comprises changing the characteristic of the report signal to indicate the occurrence of the second event.

8. The method of claim 7, wherein the characteristic comprises at least one of the following:

a pulsewidth of the report signal;

an amplitude of the report signal; or a frequency of the report signal.

9. The method of claim 8, wherein:

the characteristic comprises the pulsewidth of the report signal;

the changing of the characteristic of the report signal to indicate the occurrence of the first event comprises causing the pulsewidth of the report signal to be a first pulsewidth; and the changing of the characteristic of the report signal to indicate the occurrence of the second event comprises causing the pulsewidth of the report signal to be a second pulsewidth that is different from the first pulsewidth.

10. The method of claim 9, further comprising:

detecting, during a fourth time interval, an occurrence of a fourth event associated with an error in normal data that is stored within the memory device, the fourth event associated with a fourth event category; and reporting, to the memory controller, the occurrence of the fourth event to enable the memory controller to perform a fourth action associated with the fourth event category, wherein the reporting of the occurrence of the fourth event comprises causing the pulsewidth of the report signal to be a fourth pulsewidth that is different from the first and second pulsewidths.

11. The method of claim 10, wherein the fourth action comprises initiating a repair operation on the normal data.

12. The method of claim 1, further comprising:

generating a report signal; and providing the report signal to an interface that couples the memory device to the memory controller, wherein the interface comprises:

an alert pin of the memory device;

a mode register of the memory device; or a communication bus.

13. A memory device comprising:

a first circuit configured to:

detect, during a first time interval, an occurrence of a first event associated with mitigating usage-based disturbance, the first event associated with a first event category, the first event category associated with a first risk level;

detect, during a second time interval, an occurrence of a second event associated with mitigating usage-based disturbance, the second event associated with a second event category that differs from the first event category, the second event category associated with a second risk level that is higher than the first risk level; and generate an event signal that selectively indicates the occurrence of the first event and the occurrence of the second event; and a second circuit coupled to the first circuit, the second circuit configured to:

generate, based on the event signal, a report signal having a characteristic that changes to selectively indicate the occurrence of the first event and the occurrence of the second event; and provide the report signal at an interface that is coupled to a memory controller, the report signal notifying the memory controller of the occurrence of the first event without interrupting the memory controller and the report signal alerting the memory controller to the occurrence of the second event in a manner that interrupts the memory controller.

14. The memory device of claim 13, wherein:

the first circuit is implemented at a local-bank level of the memory device; and the second circuit is implemented at a global-bank level of the memory device.

15. The memory device of claim 13, wherein:

the interface comprises an alert pin of the memory device; and the second circuit is configured to change a pulsewidth of the report signal to selectively indicate the occurrence of the first event and the occurrence of the second event.

16. The memory device of claim 13, wherein:

the first circuit is configured to:

detect, during a third time interval, an occurrence of a third event associated with mitigating usage-based disturbance, the third event associated with the first event category; and generate the event signal to indicate the occurrence of the third event; and the second circuit is configured to:

block reporting of the third event based on an amount of time having elapsed between the occurrences of the first and third events being less than a threshold; or generate the report signal having the characteristic that changes to indicate the occurrence of the third event based on the amount of time having elapsed between the occurrences of the first and third events being greater than the threshold.

17. The memory device of claim 13, further comprising:

a third circuit configured to:

detect, during a fourth time interval, an occurrence of a fourth event associated with an error in normal data that is stored within the memory device, the fourth event associated with a fourth event category; and generate a second event signal that indicates the occurrence of the fourth event, wherein the second circuit is coupled to the third circuit and is configured to generate the report signal having the characteristic that changes to indicate the occurrence of the fourth event.

18. The memory device of claim 17, wherein:

the third circuit is configured to detect at least one of the following:

a parity error in the normal data;

an error-correcting-code error in the normal data; or a cyclic redundancy check error in the normal data; and the second circuit is configured to provide the report signal at the interface to cause the memory controller to initiate a repair operation on the normal data associated with the error.

19. A method performed by a memory controller, the method comprising:

sending normal traffic to a memory device;

receiving, from the memory device, a first report that indicates an occurrence of a first event associated with mitigating usage-based disturbance, the first event corresponding to a first event category, the first event category associated with a first risk level, the receiving of the first report occurring without interrupting the sending of the normal traffic;

selectively performing, based on the first report, a first action that is associated with the first event category;

receiving, from the memory device, a second report that indicates an occurrence of a second event associated with mitigating usage-based disturbance, the second event corresponding to a second event category that differs from the first event category, the second event category associated with a second risk level that is higher than the first risk level; and performing, based on the second report, a second action that is associated with the second event category, the second action interrupting the sending of the normal traffic to the memory device.

20. The method of claim 19, wherein:

the selectively performing of the first action comprises sending a refresh command; and the performing of the second action comprises halting normal traffic and sending multiple refresh commands until the memory device reports that the second event has been addressed.

* * * * *